United States Patent [19]

Faggin et al.

[11] Patent Number: 4,773,024
[45] Date of Patent: Sep. 20, 1988

[54] BRAIN EMULATION CIRCUIT WITH REDUCED CONFUSION

[75] Inventors: Frederico Faggin, Los Altos Hills; Gary S. Lynch, Irvine; Josef S. Sukonick, Saratoga, all of Calif.

[73] Assignee: Synaptics, Inc., San Jose, Calif.

[21] Appl. No.: 870,180

[22] Filed: Jun. 3, 1986

Related U.S. Application Data

[63] Continuation-in-part of Ser. No. 870,241, Jun. 3, 1986.

[51] Int. Cl.$^4$ .................... G06F 15/18; G06F 15/46
[52] U.S. Cl. ............................. 364/513; 364/300; 364/900; 382/15
[58] Field of Search ............... 364/513, 148, 149–152, 364/156, 300, 200 MS File, 900 MS File; 382/14, 15, 27, 1, 36–39, 48, 50; 307/201

[56] References Cited

U.S. PATENT DOCUMENTS

| | | | |
|---|---|---|---|
| 3,267,439 | 8/1966 | Bonner | 364/900 |
| 3,341,814 | 9/1967 | Chow | 382/14 |
| 3,457,552 | 7/1969 | Asendorf | 364/900 |
| 3,705,409 | 12/1972 | Brayton et al. | 364/152 X |
| 3,925,761 | 12/1975 | Chaires et al. | 382/57 X |
| 3,950,733 | 4/1976 | Cooper et al. | 382/15 X |
| 3,981,443 | 9/1976 | Lynch et al. | 364/715 |
| 4,254,474 | 3/1981 | Cooper et al. | 364/900 |
| 4,286,329 | 8/1981 | Goertzel et al. | 364/900 |
| 4,318,083 | 3/1982 | Argyle | 382/28 |
| 4,541,115 | 2/1983 | Werth | 382/14 |
| 4,573,199 | 2/1986 | Chen et al. | 382/47 |
| 4,661,913 | 4/1987 | Wu et al. | 364/554 X |

OTHER PUBLICATIONS

Hopfield et al–"Unlearning Has a Stabilizing Effect in Collective Memories"–*Nature*–304:158–159, 1983.
Tank et al–"Simple Neural' Optimization Networks: an A/D Converter, Signal Decision Circuit and a Linear Programming Circuit"–Preprint, 7/8/85.
Gelperin et al–"The Logic of Limax Learning"–*Model Neural Networks and Behavior*–date unknown.
Hopfield et al–"Collective Computation with Continuous Variables"–preprint-date unknown.
Hopfield–"Neural Networks and Physical Systems with Emergent Collective Computational Abilities"–Proc. Natl. Acad. Sci. USA, 79:2554–2558, Apr. 1982.
Hopfield et al–"Neural Computation of Decisions in Optimization Problems"–Biol. Cybern.–52:141–152 (1985).

(List continued on next page.)

*Primary Examiner*—Joseph Ruggiero
*Attorney, Agent, or Firm*—Ronald Craig Fish

[57] ABSTRACT

There is disclosed herein a recognize only embodiment of a recognition matrix comprised of a forward matrix and a reverse matrix each having a plurality of contacts which cause convergence responses on target lines when an input signal is received by said contact. Learning is performed by changing the characteristics of the contacts to alter the convergence responses they cause in accordance with a learning rule involving the comparison of total convergence response on each target line to a convergence threshold. The contacts are not programmed ad hoc in the field as events are individually learned. Instead each contact is programmed permanently by the user for a class of events which is fixed and which can never change. The user typically performs the learning on a computer simulator for all the events which a particular system is to be used to recognize. The patterns of convergence responses and contact structure characteristics which cause these convergence responses for the class of events as a whole are then examined and optimized for maximum recognition power and minimum confusion. This pattern of convergence responses or contact characteristics is then permanently programmed in the contacts of the forward and reverse matrices. A no-confusion embodiment is also disclosed whereby an array oif recognition machines are each programmed to recognize only one event, and all are coupled in parallel to an input bus carrying the signals characterizing the event to be recognized. The outputs are or'ed together.

2 Claims, 17 Drawing Sheets

OTHER PUBLICATIONS

Toulouse et al–Institut Pasteur, Paris, France–"A Spin Glass Model of Learning by Selection"–date unknown.

Aleksander–"Emergent Intelligent Properties of Progressively Structured Pattern Recognition Nets"–Pattern Recognition Letters–1:375–384 (1983).

"The Wizard Adaptive Image Classifier: Origins, Operation, Applications,"–date unknown.

Stonham–"Networks of Memory Elements–A Processor for Industrial Automation"–Digital Systems for Industrial Automation, 1:2–3 (1982).

Stonham–"Practical Face Recognition and Verification with Wizard"–Aspects of Face Processing–date unknown.

Carol–"Neuronal Circuits Involved in Learning the Use of Modifiable Synapses in the Simulation of Behavior"–Intern. J. of Neuroscience, 6:273–278 (1976).

Carol–"Neural Modeling of Human Behavior: A Proposal for a New Type of Modifiable Synapse"–Intern. J. Neuroscience, 7, 2 or 3–1977.

Edelman–"Selective Networks Capable of Representative Transfromations, Limited Generalizations, and Associative Memory"–Proc. Natl. Acad. Sci. USA, 79:2091–2095 (1982).

Sejnowski et al–"Learning Symmetry Groups with Hidden Units: Beyond the Perception"–Reports of the Cognitive Neuropsychology Lab., 10–date unknown.

Kohonen et al.–"Storage and Processing of Information in Distributed Associative Memory Systems", date unknown.

Hopfield–"Brain, Computer and Memory"–Engineering and Science, 1982.

Hopfield–"Neurons with Graded Response Have Collective Computational Properties Like Those of Two-State Neurons"–Proc. Natl. Acad. Sci. USA, 81:3088–3092, May 1984.

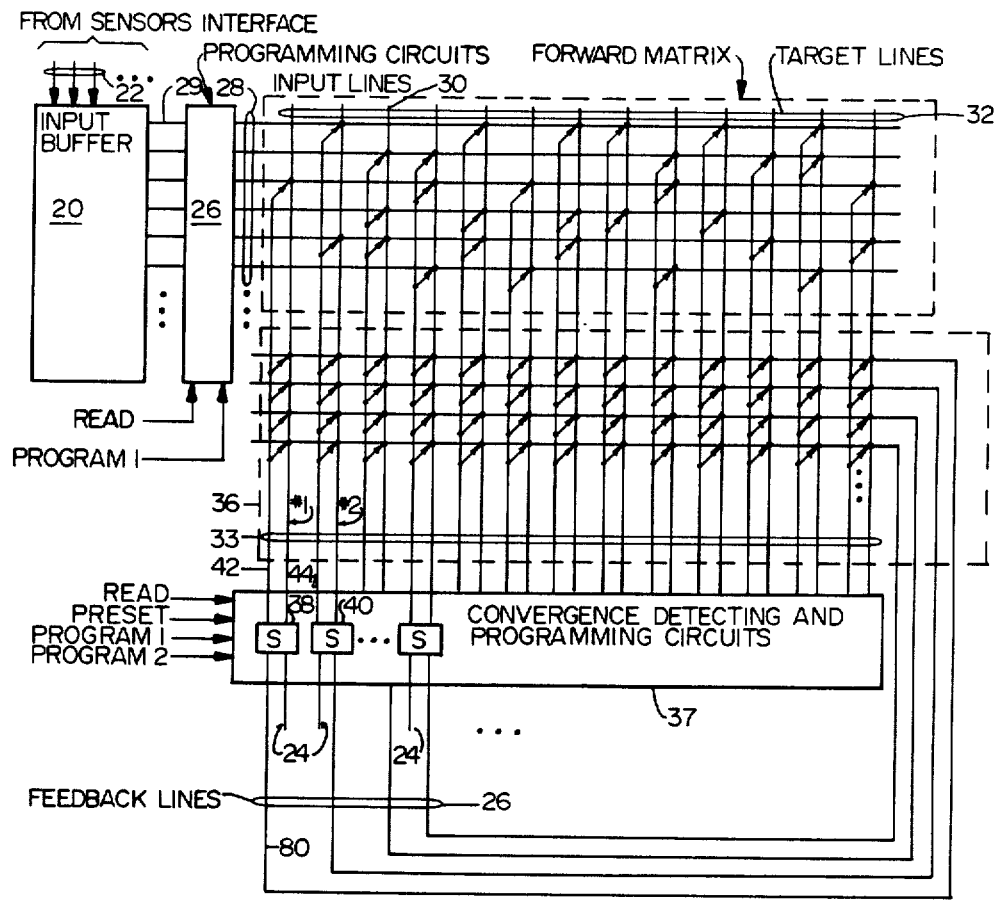
FIG. 1
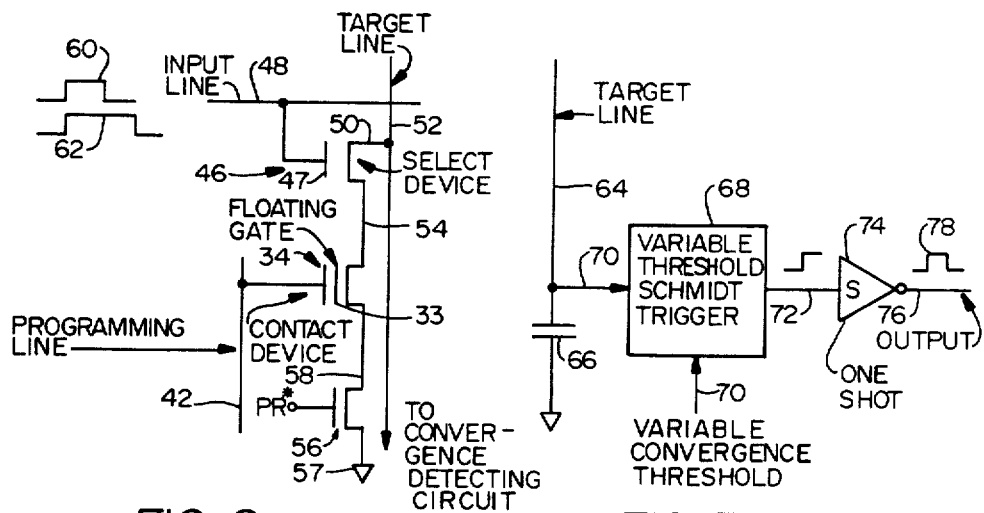
FIG. 2
FIG. 3

FIG. 16 PATTERN COMPARATOR MATRIX

RECOGNIZE ONLY EMBODIMENT

BRAIN EMULATION CIRCUIT WITH REDUCED CONFUSION

BACKGROUND OF THE INVENTION

This is a continuation in part application of U.S. Patent Application entitled "Brain Learning and Recognition Emulation Circuit and Method of Recognizing Events", Ser. No. 870,241, filed 06/03/86 and assigned to The Meno Corporation, a California Corporation. The inventor of the new embodiments disclosed herein, Joe Sukonick, contributed the new matter discussed herein as the ROM Recognize Only Embodiment and the No-Confusion Recognition System each of which is discussed under separate heading below. All the other embodiments were invented by the inventors named in the parent application.

The invention pertains to the field of circuits for emulating high order functions performed in brain cortex. More particularly, the invention pertains to circuits which can emulate the learning and recognition functions of the brain.

There has been a long history of efforts by workers in the art to describe and in a few cases to develop electronic circuits which emulate higher order brain functions such as memory or learning and perception/recognition. Circuits or models which have been developed in the past of which the applicants are aware can generally be broken down into several major categories. As far as the applicants in this and the parent case are aware, only the perceptrons described below were actually built, although there is some possibility that a Kohonen type association matrix has been built. All the other devices have only been simulated on computers.

All these previous devices sense an input event and output a pattern of output signals which identifies the event more or less accurately. The first category is perceptrons. Perceptrons generally involve two stages of circuitry. The first stage receives the physical stimulus and generates outputs which characterize the event sensed. The second stage recognizes and identifies the event by generating a pattern of output signals that identifies the event, if the event has been previously learned, by sampling the output signals from the first stage and processing these samples.

Events are learned by strengthening and weakening couplings. That is, the perception class of previous devices learns by changing the connections between the first stage and second stage circuitry. These changes are made in accordance with the perceptron learning rule. This rule is as follows. When an event is sensed, the decision cells form a pattern of outputs. If this pattern is the same as a pattern chosen by the user to represent the input event, then nothing happens. If a cell in the output array fires when it is not supposed to fire for the user selected output pattern, i.e., a false positive indication, then the coupling for that cell are weakened to make it less likely to fire the next time the same event is sensed. If a particular cell does not fire when the input event is present and the cell is supposed to fire to make up the output pattern chosen by the user to represent the event, then the connections for that cell are strengthened. If a particular cell fires only when it is supposed to fire for a given event and does not fire when it is not supposed to fire when the event is not present, then that cell's connections are not changed.

Perceptrons learn by convergence over several presentations of the same event. The learning process is characterized by the changing of cell connections to strengthen or weaken them until the output pattern converges with the desired output pattern selected by the user. This convergence process is repeated for several different input events such that the perceptron eventually becomes able to recognize any of a number of events.

In a 1969 monograph by Minski and Papert [Ninski, M. & Papert, S., 1969, *Perceptrons*, (Cambridge, MIT Press)] an analysis of perceptrons was carried out. It was shown in this paper that perceptrons have limited powers of recognition, and are unable to carry out logic operations needed of higher preceptual functions. It was proposed that intermediate layers of cells between the detection and decision stages would be needed. However, this paper argued that adequate learning rules would be exceptionally difficult to design for such an arrangement. Partially because of the ideas presented in this 1969 paper, perceptrons fell into disuse. However, certain modified forms of perceptrons are now returning to the attention of workers skilled in the art.

A second major class of previous devices is association matrices. An example of these types of devices is described in a 1981 paper by Willshaw [Willshaw, D., Holography, Associative Memory, and Inductive Generalization, in 'Hinton, G. E. and Anderson, *Parallel Models For Associative Memory*, Hillsdate, N.J., Lawrence Erlbaum, 1981- (pp. 83–104)]. Association matrices generally take one basic form. A simple matrix comprised of horizontal lines crossing and contacting an equally sized set of vertical lines is constructed. Each vertical line terminates in a voltage summing device. The horiziontal lines are used as inputs and simulate the functions of axons in the cortex structure of the brain. The vertical lines simulate the function of dendrites extending from neurons, and the voltage summing device acts to simulate the function of the neural cell body.

A second set of inputs to the vertical lines is provided. Each of the inputs in the second set of inputs contacts one vertical line or its voltage summing device. This second set of inputs will be referred to hereafter as the vertical inputs and will be numbered $F_1$-$F_n$. The horizontal lines will be referred to as the horizontal inputs and will be labeled $H_1$-$H_n$. The vertical lines of the matrix which emulate the function of dendrites will be labeled $J_1$-$J_n$. The matrix is defined in two dimensions by the connections between the H inputs and J dendrites. The summing elements may be either linear or nonlinear. If linear, they produce an output which has a voltage or current amplitude which is proportional to the input amplitude on the dendrites. If the summing elements are nonlinear, they produce a binary output which is active only when the amplitude of the signal on the dendrites exceeds a certain theshold. The association matrices taught by Kohonen [Kohonen, J. and Lehtio, P., "Storage and Processing of Information in Distribution Associative Memory Systems", in G. E. Hinton and J. A. Anderson, *Parallel Models of Associative Memory*, Hillsdale, N.J.: Lawrence Erlbaum 1981, (pp. 105–143)] use linear summing elements, whereas most other workers in the association matrix art use nonlinear summing elements.

The association matrix learns by increasing the strength of the contacts to selected target lines which are selected by the user. For example, the user will activate a pattern of the vertical inputs F selected by him or her to represent a particular event. Assume that the user selected pattern is F elements 1, 3, 7 and 9. These activated F inputs will produce outputs on a one to one basis on their corresponding J target elements 1, 3, 7 and 9. To learn a particular event, the event sensed causes a particular subset of the horizontal input or H elements to be activated in response to certain characteristics of the event. Since association matrices generally have a contact between every horizontal input and every target element, the event activates horizontal inputs H which contact the target elements J which have been activated (J elements 1, 3, 7 and 9) by the user activated vertical inputs F elements 1, 3, 7 and 9 have their contacts strengthened. This process is repeated for a number of events with the user selecting a different pattern of vertical inputs or F elements to activate for each pattern to be learned.

To use such an association matrix which has learned a collection of input patterns for association, the F inputs are deactivated, and an event is sensed and the horizontal inputs H which characterize the event are activated by the characteristics of the event. This pattern of active horizontal inputs will, if the strengthening process is performed properly, cause the output pattern which was selected by the user (to represents the particular event sensed) to appear again. This pattern is then compared to the known patterns for events which have been learned and the particular event which sensed may be identified.

A problem with associative matrices is cross-talk. The particular patterns of horizontal inputs which characterize each event may be orthogonal in the sense that the particular inputs which represent each event do not overlap. Conversely, the horizontal inputs may be non orthogonal in the sense that there is some overlap between active horizontal inputs characterizing two or more events. This overlap cannot be minimized by the user since the horizontal inputs which are activated for each event depend only upon the characteristics of the event and not upon the desires of the user. Where there is overlap, then cross-talk results in that one event's horizontal input pattern will cause recall of some or much of the output pattern of another event's output pattern.

Such association matrices may also be used as autocorrelation matrices. In such a structure, there are no horizontal inputs H, only vertical inputs F and target elements J, but the outputs of the target elements J are fed back through the dendrites or target elements as if they were horizontal inputs H to form a matrix. During the learning process, assume that F elements 1, 3, 5 and 7 are activated. This causes J elements 1, 3, 5 and 7 to be activated, and the outputs from these J elements are routed back through the matrix. Since J element number 1's output line contacts the dendrite or target lines of J elements 3, 5 and 7, these contacts are strengthened. The same is true for the other J outputs. The result is that the association matrix so trained will cause the entire output pattern 1, 3, 5 and 7 to appear by virtue of the input even if some of the F inputs are missing from an input pattern.

Another major class of previous devices in this field is relaxation models. In both the perceptron and association matrix previous devices, the output vector or pattern of output signals representing a particular event is assigned by the user. Usually the output vectors are chosen to be identical with or similar to the object to be recognized. More recent work on so called "connectionist" models allows the network itself to select the output pattern to represent the event sensed. This is accomplished by placing constraint rules in the matrix such that when the matrix is allowed to "free run", i.e., cycle in state space from an initial state which is somewhat like an event which has been learned, then the matrix will gravitate toward or converge toward a state represented by an output vector which represents an event which has been learned. Thus the matrix acts as a content addressable memory where the memory of a learned event is reached by supplying the matrix with input information which is a subset of the input information which originally defined the event which was learned. Any subset of adequate size will suffice. Such a matrix is said to be addressable by content rather than address. In essence, a randomly organized network of connections will cycle until a pattern emerges, and that pattern will remain stable until the network is perturbed by additional input.

An advanced perceptron has been proposed by Sejnowski and Hinton [Sejnowski, T. J., Kienker, P. K., and Hinton, G. E., Learning in Symmetry Groups With Hidden Units: Beyond the Perceptron, *Reports of the Cognitive Neuropsychology Laboratory*, (#10), The John Hopkins University, Baltimore, Md.] using the relaxation model concepts. Their simulation uses input elements, an intermediate layer of elements and a final array of output or decision elements. The traditional perceptron learning rule is used but in a probablistic fashion in the sense that synapses change when the pre and post-synaptic elements are simultaneously active according to a sigmoid probability function. Moreover, all contacts or synapses are symmetrical so that the inputs and intermediate elements are reciprocally connected and the same is true for the intermediate and final decision elements. The strength of contacts, i.e., changing of the properties of the synapses, can becomes less in terms of the effects the synapses cause in response to input stimuli. In some variants of the model, the elements within a layer are mutually inhibitory. Also, the decision elements are assigned values rather than being simple, binary neuron-type elements.

Hopfield [Hopfield, J. J., Neural Networks and Physical Systems with Emergent Collective Properties, Proc. Nat. Acad. Sci. (U.S.A.) 1982, 79, pp. 2554–2558] uses a single layer of randomly interconnected elements with one input line for every target line. His design thus resembles an association matrix with autocorrelational functions. Contacts can be inhibitory or additive in that each contact, when active, may either add or subtract to the response on a particular target element. The system is largely symmetrical.

When an input is presented to a Hopfield matrix, the system cycles through a series of synaptic or contact changes until the entire network settles into a pattern. The patterns that emerge transiently across successive cycles can be thought of as successive energy states. Because of the symmetry and the possibility of sign reversal, the entire system behaves like a multibody problem in physics seeking a local energy minimum. A particular minimum will be found depending upon the pattern of inputs that is applied to the system.

The foregoing association machines present several problems. First in machines where the contacts may change either negatively or positively, when more than one event is learned, there is a possibility that later learned events may obscure the record of earlier learned events. Further, there is generally a high percentage of contacts relative to the number of input lines and target lines. This limits the number of output vectors which the system may provide for a given number of contacts. In systems where the operator selects the output vector which is to represent a particular event and the number of contacts is high relative to the number of input/target line intersections, cross-talk can occur. This creates a need for orthogonality of input vectors for good recognition properties. Further, the systems discussed above are not capable of reliable, consistent association of input stimuli with the correct output vector for cluttered or incomplete input vectors. The cluttered input vector situation arises when the input stimuli are cluttered by noise. The incomplete input vector situation arises when the input stimuli for a particular event are not all present, i.e., only part of the input vector characterizing a particular event which has been learned is active. Thus a need has arisen for a learning and association machine which can overcome some of the above noted deficiencies and provide new abilities not heretofore present in the art.

SUMMARY OF THE INVENTION

In accordance with the teachings of the invention, there is disclosed herein an improvement on the systems described in the parent application in the form of a recognize only embodiment and a no-confusion embodiment. The recognize embodiment is structured as described in the parent application except that the contact structures are simpler, and there is no programming circuitry. Instead each contact is programmed permanently by the user for a class of events which is fixed and which can never change. The user typically performs the learning on a computer simulator for all the events which a particular system is to be used to recognize. The patterns of convergence responses and contact structure characteristics which cause these convergence responses for the class of events as a whole are then examined and optimized for maximum recognition power and minimum confusion. This pattern of convergence responses or contact characteristics is then permanently programmed in the contacts of the forward and reverse matrices. Typically, the contact structures will comprise transistors on an integrated circuit whose channel width is adjusted in accordance with the desired convergence response to be generated by that contact in accordance with the optimized pattern of convergence responses established by the user for recognition of the class of events to be recognized. The channel width is adjusted to get the proper resistivity therein to create the desired convergence response on the associated target line when an active input signal is applied to the gate of the contact transistor.

A no-confusion system comprised of an array of systems like those described herein all coupled in parallel to an input bus which carries the data characterizing the event to be recognized simultaneously to all the systems. Each system is trained to recognize only one event, and all the pattern label outputs from each system or wire-or'ed onto an output bus. The system which recognizes the event will place the proper pattern label at the input of the wire-or circuit, and all the other systems will have all zero pattern labels. The output bus will therefore carry the proper pattern label identifying the event on the input bus. No confusion can result, because each system is taught to recognize only one event.

BRIEF DESCRIPTION OF THE DRAWINGS

FIG. 1 is a block diagram of the matrix portions of the system of the invention.

FIG. 2 is a schematic diagram of the contact structure of the invention.

FIG. 3 is simplified block diagram of the convergence detecting circuitry of the invention which emulates the function of a neuron in the brain.

DETAILED DESCRIPTION OF THE PREFERRED EMBODIMENT

Figure 4:
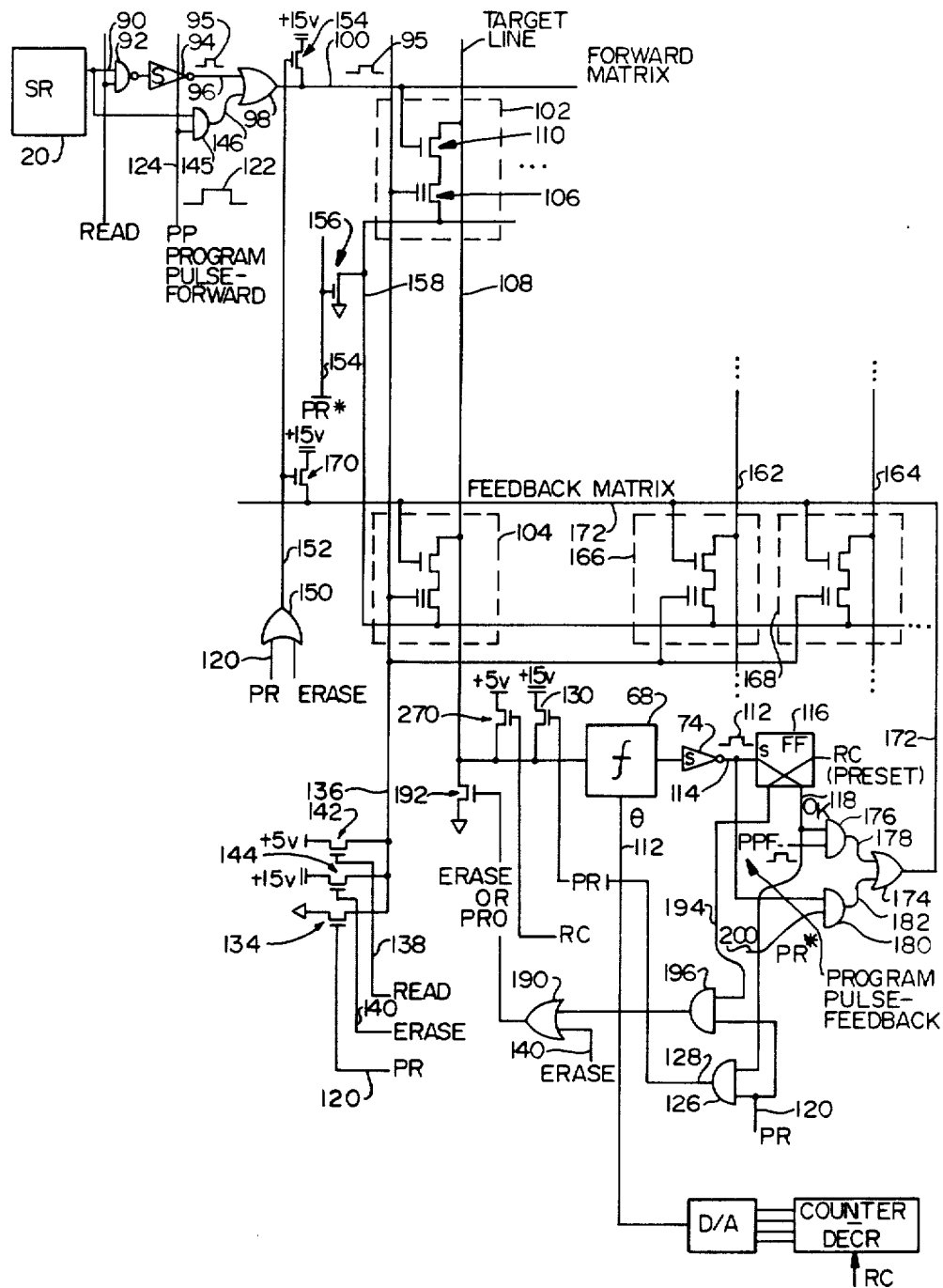
FIG. 4 is a schematic diagram showing a typical arrangement for one target line and showing a contact structure in the forward matrix and several contact structures in the feedback matrix along with the programming circuitry to program these contacts in accordance with the learning rules.

Referring to FIG. 1 there is shown a block diagram of the forward and reverse matrices and their associated convergence detecting and programming circuits of the invention. The system of the invention includes an input buffer 20 which receives the entire frame of sensor output data on lines 22 from the sensor interface circuitry (not shown) and stores it for later processing by the system. The invention may be used with any type of sensor data. For example in character recognition systems or other optical applications such as face or fingerprint identification, the input data on the lines 22 could be pixel data from video processing circuitry associated with a camera. In other applications such as voice print identification, the input data on the lines 22 may be the individual outputs of various filters and other signal processing circuitry which sense the audible event and characterize it such as by its energy content in various narrow spectral bands, its frequency components or any other imaginable criteria. In electronic signal processing, the inputs on the lines 22 could be outputs from various other signal processing circuitry that sense an electronic event and develop signals which characterize the event. Such characterization could be based upon any characteristic of interest such as frequency components, energy levels in certain energy bands, cross correlation with other signals, etc. The type of input signal is not critical to the invention, since the invention is a general purpose machine which can learn the characteristics of events and later associate input signals from events of unknown identity and identify these events as either being an event which has been previously learned or not.

The input signals on lines 22 may be collectively referred to as the input vector. For each input vector, the apparatus of FIG. 1 develops a collection of output signals on the output bus 24. The collection of output signals will be collectively referred to as the output vector. Each different pattern of input signals and each different pattern of output signals represents a different vector having different components or elements. The input signals on lines 22 may be either one bit data representing each element of the input signal as either on or off, or multibit data. In the latter case, each individual line of the bus 22 may represent a 4 bit nibble or an 8 bit byte if the individual pixel or other element of the input vector has multiple analog values, e.g., gray scale values from 0 to 15 may be represented by 4 bit nibbles.

In the preferred embodiment, the input buffer 20 receives its input signals on bus 22 from an analog to digital converter or converters in the sensor interface. The input buffer 20 will be detailed below, but for present purposes, the buffer 20 consists essentially of a plurality of shift registers and clock circuitry which shift in the digital data appearing on the bus 22 until the data from an entire "frame" has been shifted into the buffer. Hereafter, the invention will be described in terms of an optical recognition application with 4 bit nibbles representing pixels which may have any of 16 analog levels. However, this invention is to be understood as broadly applicable to many different applications for which there are analogs of the concepts discussed herein.

In the preferred embodiment, the input buffer 20 and a programming circuit 26 are combined into a single unit. The combined unit includes circuitry to convert the value of each pixel from its digital value to a pulse or pulses of uniform ampltiude but with a combined pulse width which is proportional to the binary value of the corresponding input data. These pulses emerge on input lines 28 to a forward matrix 30. There is one input line 29 for every pixel in the frame.

The Learning Process

There will next be described in parallel the structure of the forward and feedback matrices, the contact structures therein, the convergence detecting and programming circuits and the manner in which they are used to learn the characteristics of an event. The preferred embodiment of the invention includes a forward matrix 30 comprised of the plurality of input lines 28 intersecting with a plurality of target lines 32. The forward matrix 30 is sparsely populated with "contacts" which are placed at random intersections of the input lines and the target lines. In some alternative and equivalent embodiments, the contacts in the forward matrix may be sparse and spaced in ordered fashion. The contacts are shown as black dots in FIG. 1, but this is not to be understood as an electrical connection between the input line and the target line. The contacts do couple the input line to the corresponding target line at each intersection in the sense that each input line which is active, i.e., which carries a non-zero pulse width signal, causes a "convergence" response on the corresponding target line. The structure of the contacts in both the forward and feedback matrices is shown in FIG. 2 which will be discussed below. The magnitude of the convergence response caused by a particular active input line is determined by the amount of charge which has been programmed onto the floating gate 33 of a floating gate transistor 34 in every contact structure. The charge programmed onto the floating gate changes the voltage thereof. The voltage change on the floating gate is a linear-log relationship of the pulse duration of the programming pulse. A one millisecond programming pulse will cause the floating gate to be charged to about +6 volts whereas a 100 microsecond programming pulse will charge the floating gate to about +2 volts. The structure and operation of these types of transistors is well known to those skilled in the semiconductor, non-volatile memory art.

There is a feedback matrix 36 which consists of the intersection of a plurality of feedback lines 26 with the target lines 32. The feedback lines 26 carry signals generated from the output lines 24 and gated by programming circuitry in the convergence detecting and program gating circuitry (hereafter the "convergence detecting circuitry") for each target line. The convergence detecting circuitry for target line number 1 is shown at 38, and the convergence detecting circuitry for target line number 2 is shown at 40. There is a convergence detecting circuit for each target line, and the details of these circuits will be discussed below.

The feedback matrix has a contact at every intersection, but these contacts are programmed to zero charge on the floating gates at the outset of the learning process. Thus, the magnitude of any convergence response on the target line caused thereby is zero until such time at the contact is programmed to have some charge on the floating gate.

Learning occurs in the preferred embodiment of the invention by changing the charge on the floating gates of the floating gate transistors in the contact structures of both the forward and reverse matrices in accordance with certain learning rules. In other embodiments, other programmable contact structures may be used, and the learning process will occur by altering some characteristic of the contact structure in accordance with the same learning rule such that the magnitude of the convergence response caused by an active input line for a contact structure so altered is changed. All such alternative embodiments are deemed to be equivalent if they may be programmed in accordance with the learning rules so as to alter the magnitude of the convergence response on a target line or in a target zone the next time the input line for the contact so altered is active.

The programming of the contacts is carried out by the convergence detecting circuitry for each target line. Programming or altering of the charge on the floating gates of contacts in the forward matrix on a particular target line of interest is performed by causing certain voltage conditions to occur on the target line and on a programming line coupled to each contact associated with a target line. The programming lines are the lines such as 42 and 44 in FIG. 1 emerging from the convergence detecting circuitry 38 and 40 for target lines number 1 and 2. The collection of programming lines and target lines will collectively be referred to as bus 33. Each target line has an associated programming line, but in the preferred embodiment, the programming lines for each target line are coupled together and driven by a single driver. The programming line for each contact is coupled to the "top gate" of the floating gate transistor in the contact structure as shown in FIG. 2.

Referring to FIG. 2, the contact structure used in both the forward matrix and the feedback matrix is shown for the preferred embodiment. The contact structure is comprised of an MOS select transistor 46 having its gate 47 coupled to an input line 48 and its drain 50 coupled to a target line 52. The source 54 of the select device 46 is coupled to the drain of the floating gate transistor (hereafter the "contact device"). The source of the contact device is coupled to the drain of transistor 56 which has its source coupled to a reference voltage which is normally ground. The gate of this transistor is coupled to a signal PR* which is active low when programming of the contact is to occur. The purpose of the transistor 56 is to disconnect the source of the contact device 34 from ground during programming. This is necessary to prevent a path to ground during programming which would discharge the charge pump used in the preferred embodiment thereby lowering its voltage to below the required high voltage needed for programming. In embodiments where a separate high voltage supply is used and the voltage may be maintained high even when current is lost through the channel of the floating gate device, then there is no need for the transistor 56. It presence is preferred because it eliminates the need for a separate power supply.

To program the contact device requires several things to happen. First, a sufficiently high voltage must be placed on the input line 48 to turn on the select device 46. This may be any positive voltage equal to in excess of the minimum voltage needed on the drain 54 of the floating gate device 34 plus the threshold voltage of the transistor 46.

The second thing that must happen to program the contact device 34 is that the target line 52 must be driven to approximately +15 volts for contact device 34 to program a logic one therein. To leave the charge on the floating gate 33 unchanged at whatever value it has, the target line 52 is driven to 0 volts.

Finally, the PR* signal must be activated to float the source of the contact device 34, i.e., disconnect it from ground, and the programming line 42 must be driven to zero volts from the normal read state when the programming line and top gate are maintained at approximately 5 volts. When the top gate is driven to 0 volts from 5 volts to program the contact device where the floating gate was originally at 0 volts, capacitive coupling to the floating gate will drive its voltage to approximately −4 volts. This causes a high field across the thin oxide (approximately 100 angstroms) separating the floating gate 33 from the drain 54. This high field causes tunneling of electrons from the floating gate to the drain electrode 54 leaving the floating gate positively charged. When the programming voltages are removed, this positive charge remains on the floating gate indefinitely and influences the conductivity of the channel region between the drain 54 and the source 58. Higher positive charge on the floating gate tends to render the channel less resistive thereby allowing more charge to flow therethrough per unit time for a voltage applied across the drain 54 and the source 58. The disconnection of the source 58 from ground during programming by the action of the transistor 56 and the PR* signal allows the programming to occur and minimizes voltage drop in the circuitry preceding the drain 50 which would be caused by current flow to ground through the channel of the floating gate and select devices. This voltage drop could cause the voltage at the drain 54 of the floating gate to drop below the level needed to create a sufficiently strong electric field across the oxide separating the floating gate from the drain 54 to prevent tunnelling of charge through the oxide and the programming which results therefrom. The drain 54 must be kept above 12 volts to program present day floating gate devices. However, as noted above, the presence of transistor 56 could be eliminated if a separate high voltage supply is used.

The convergence response caused by the contact structure of FIG. 2 for an active input line is charge drain out of the integrating capacitor associated with the target line 52. The magnitude of the convergence response is equal to the amount of charge drained out of the target line 52. The convergence response occurs whenever the input line 48 is activated during reading for purposes of performing either the learning algorithm or the recognition algorithm. As an example, two convergence responses for two different input signals will be examined. First, assume that the pixel associated with the input line 48 has a value of 1 on a scale from 0 to 16. This value is converted by the input buffer 20 to a pulse 60 of a width proportional to the value 1 (hereafter this pulse width will be designated the "unit width" and corresponds to a "unit time"). This pulse turns on the select device 46 thereby connecting the target line 52 to the drain of the contact device 34.

The convergence detecting circuitry has associated therewith an integrating capacitor, which, in the preferred integrated circuit embodiment, is the parasitic capacitance of the target line itself. Prior to a read cycle, this capacitance is precharged to a predetermined voltage. The convergence response caused by the pulse 60 on the input line 48 is to drain some of the charge on the capacitance of the target line 52 to ground in proportion to the pulse width of the pulse 60 since that controls the time during which the target line 52 is coupled to the drain of the contact device 34. This lowers the voltage of the target line 52 by some amount toward the voltage level of the reference voltage at the source 57 of the transistor 56. If the inputs pulse had been a pulse such as that shown at 62 having a duration twice as long as the duration of the pulse 60, then the amount of charge which would be drained from the target line 52 would be twice as much, because the select device 46 would be turned on twice as long.

The amount of charge which is drained is not only proportional to the duration of the pulse 60, but also to the resistance of the channel region of the contact device 34. The resistance of the channel region of the contact device does not change much after the first few times the contact device is programmed. This is because the voltage on the floating gate does not change much with subsequent programming after the first few programming cycle. The voltage on the floating gate is proportional to the amount of charge which tunnels from the floating gate during programming. The amount of charge that tunnels from the floating gate is proportional to the logarithm of the field strength between the floating gate and the drain. Thus when the floating gate is charged, the field across the thin oxide to the region is less and the amount of charge that tunnels on a second programming cycle is less than the amount of charge that tunneled the first time programming was performed. The next time programming is performed, the amount of charge that tunnels is even less. The resistivity of the channel is controlled by the amount of charge on the floating gate, as that charge causes a field to exist between the floating gate and induced charges in the channel region. These induced charges alter the resistivity of the channel. Thus, the resistivity of the channel is affected most by the first few programming cycles, and subsequent programming cycles do not change the voltage of the floating gate or the resistivity of the channel much. Typically for a given programming pulse width, the first programming will raise the voltage on the floating gate to about +4 volts. The second programming will raise the voltage from +4 to about +5 volts. The third programming will raise the voltage from +5 to about +5.5 volts. The fourth programming will raise the voltage from +5.5 volts to about +5.75 volts. The fifth programming will raise the voltage from +5.75 to about +5.9 volts. The process continues and asymptotically reaches about +6 volts. Other programming pulse widths will change the aforementioned voltages somewhat. The amount of charge added during any programming step is exponentially related to the programming pulse duration or the field strength created by the programming voltage.

It is therefore fair to say that the magnitude of the convergence response caused by any particular input pulse on the input line is substantially proportional to the pulse duration and the amount of charge that has been stored on the floating gate. Note that in the system of the invention, each subsequent programming only "strengthens the contact" in the sense that the magnitude of the convergence response only increases with subsequent programming steps. Subsequent learning episodes can never destroy or lessen the charge pattern throughout the matrix from previous learning episodes, because charge is always added to the floating gates and never subtracted.

Before the learning rule and the process of programming contacts selected using the learning rule can be discussed, the concept of convergence and the structure of the convergence detecting circuits 38 etc. must be understood.

Referring to FIG. 3, there is shown a simplified block diagram of the convergence detecting circuit without the presence of the programming circuitry. The purpose of the circuitry of FIG. 3 is to determine if convergence on a target line has occurred and to generate an output signal if it has. Each target line has a circuit such as FIG. 3. Convergence on the target line 64 is determined by comparing the voltage on a integrating capacitor 66 to a user definable threshold voltage. This is done by a variable threshold Schmidt trigger 68 which has its trigger input 70 coupled to the ungrounded side of the capacitor 66. The Schmidt trigger 68 has a user defined, variable theshold which is established by a voltage on the line 70.

The capacitor 66 integrates the convergence responses caused by all contacts which have active inputs and which are programmed to have some conductivity in their channel regions of the contact devices. This convergence detecting is done by the loss of charge of the capacitor 66 which is proportional to the integration of the magnitude of the charge loss caused by each programmed contact with an active input. When the voltage on the capacitor 66 drops below the threshold value, the Schmidt trigger changes states on its output 72. This change of state is coupled to the trigger input of an edge triggered one shot which outputs a pulse of predetermined pulse width on an output line 76. The pulse width of the pulse 78 may be set by the user at design time. The pulse 78 is fed back into the feedback matrix as an input pulse. For example support target line number 1 converted for a given event. In such a case, the convergence detecting circuit 38 would output a pulse like pulse 78 on the output line 80 during a normal read and this pulse would be coupled to the gates of all the select devices like device 46 in FIG. 2 for all contacts coupled to the line 80 in the feedback matrix. The effect of this will be explained more fully below.

The Learning Rule

The learning rule is the rule by which contacts in the forward and feedback matrices are selected for programming. Simply stated and ignoring the false positive case where the machine improperly identifies an event as another event, the learning rule is as follows. In the forward matrix all contacts are initially programmed to have +4 volts on their floating gates. When an event is to be learned, all contacts which are coupled to both an active input and to a target line for which there is convergence are programmed once which raises their floating gate voltages to approximately 5 volts. In the feedback matrix, all contacts are initially programmed to to 0 volts on the floating gates. When an event is to be learned, all the contacts which are coupled between a target line which has converged and a feedback line which is active (feedback lines are active when their corresponding target lines have converged) are programmed. The amount or programming or charge on the floating gates in the feedback matrix is user defined by settling the pulse duration of the programming pulse. The duration of the pulse from the one shot 74 needs only be sufficient to set the latch in the programming circuitry. Programming of the feedback contacts allows the system to recognize previously learned input patterns when later presented with a version of the input pattern which is incomplete or which has missing elements. The manner in which this occurs will be explained more fully below. The ability to recognize input patterns which are cluttered by noise comes from the learning rule and circuitry for programming the forward matrix, the ability to alter the convergence threshold and from the method of operating the device during recognition cycles in progressively lowering the convergence threshold from an initially high value.

Referring to FIG. 4 there is shown a circuit diagram for the circuitry which is used to program the forward matrix and the reverse matrix contacts. There is a circuit identical to that of FIG. 4 for every target line. This circuitry is applicable to single bit pixels and is not capable of programming to implement the learning rule for the false positive case which will be discussed below. Therefore FIG. 4 is an alternative embodiment and not the preferred embodiment of the programming circuitry.

The pixel data is stored in shift register 20. For simplicity, only one input line is shown emerging from the shift register where in fact there will be typically 512 input lines correseponding to a 16 row by 32 column "frame". The bit corresponding to the pixel value emerges on a line 90 and is coupled to an input of a NAND gate 92. The other input of this gate 92 is coupled to a READ signal which is active high when reading is to be performed and low when programming is to be performed. The output of the NAND gate 92 is coupled to the trigger input of a negative edge triggered one shot 94. When the pixel is a color which corresponds to a logic 1 on line 90, and READ is active, the one shot is triggered and outputs a pulse 95 on the line 96. This line is coupled to an input of an OR gate 98. Thus the pulse 95 passes through the OR gate 98 thereby being transmitted on input line 100 into the forward matrix.

For simplicity, only one contact structure 102 is shown in the forward matrix and one contact structure 104 is shown in the reverse matrix. Since the contact device 106 has been pre-programmed to have a voltage of approximately 4 volts on its floating gate, the pulse 95 will cause a convergence response on the target line 108 when it turns on the select device 110. This convergence response will be the unit response for pixels which are "on", and the magnitude of the response will depend upon the pulse width of the pulse 95. The response, in this embodiment, will taken the form of some amount of charge being drained out of the parasitic capacitance associated with the target line 108 in an integrated circuit embodiment. In a discrete embodiment, the target line 108 would probably have a discrete integrating capacitor such as the capacitor 66 in FIG. 3 coupled thereto.

The convergence responses on the target line 108 would be measured by the Schmidt trigger 68 by comparing the voltage on the target line 108 to the user defined threshold voltage "theta" on line 112. Note that the actual sum of convergence responses is not computed other than to the extent necessary to determine if the sum exceeds the user defined threshold. In some embodiments, the actual sum might be computed, and the programming in the forward and reverse matrices may be performed such that various sums translate into more "strengthening" of the contacts, i.e., programming to cause a convergence response magnitude which is proportional to the actual sum of convergence responses which caused convergence when next the input line of a contact so programmed is activated.

To illustrate the programming of the contact 102, assume that the sum of convergence responses on the target line 108 exceeded the threshold. The Schmidt trigger 68 would change states thereby causing the one shot 74 to output a pulse 112 on a line 114. This would set a flip flop, and cause its Q output 118 to be set at a logic 1 level. The signal on line 118 is designated $O_k$ for "output signal from the k'th target line" 108. Programming of the contact 102 occurs when the number of target lines which have converged is within an acceptable range. To do learning, it is desirable to alter the threshold from an initially high value until the number of target lines which have converged is some user defined acceptable range of the total number of target lines. This will be explained later in connection with the explanation of the algorithm for learning. For present purposes, assume this condition has occurred, and control logic (not shown) has determined that the number of flip flops like 116 which have been set is within the acceptable range. At that time, if the learning mode is active, the control logic will activate a PR signal on line 120 and will generate a programming pulse 122 designated PP on line 124. These two signals are coupled to the convergence detecting and programming circuitry for every target line and input line. A separate programming pulse PPF is generated to program the feedback matrix contacts as will be discussed below. The PR signal is active high when either the forward matrix or the feedback matrix is being programmed, and will stay active for the maximum duration of the PP signal followed by the PPF signal.

The effect of the activation of PR and PP is to create the proper voltage conditions for programming the contacts in the forward matrix which is coupled between input lines 90 which are at the logic 1 level and target lines which have converged. In the case of contact 102, the input line 90 is at a steady logic 1 level, and the flip flop 116 is set so there is a logic 1 level on line 118. Line 118 is coupled to the input of an AND gate 126, and PR is active, so the output line 128 is a logic 1 level. This turns on an MOS transistor 130 thereby coupling a +15 volt supply to the target line 108. The control logic also activates the PR signal on line 120 thereby turning on a transistor 134. This couples the program line 136 to ground thereby forcing the top gate voltage of the contact device 106 to 0 volts. The signals READ and ERASE on lines 138 and 140 are both inactive, and the transistors 142 and 144 are off during the programming operation. All the proper voltage conditions are then present for programming of the contact device 106. When the control logic activates the PP programming pulse 122, an AND gate 145 couples the pulse 122 through to its output line 146 where it is coupled through the OR gate 98 to the input line 100. The activation of the PR signal also causes an OR gate 150 to output a logic 1 on a line 152. This turns on a transistor 154 thereby coupling a +15 volts to the gate of the select device 110. Because the OR gate 98 has a logic 1 at its output, no current sinking from the input line 100 through the output of the OR gate 98 occurs, and the select device 110 turns on. The programming pulse 122 thus turns on the select device 110 for the duration of the programming pulse thereby coupling the +15 volts on the target line 108 to the drain of the contact device 106. This causes tunneling to occur, and charges the floating gate of the contact device from about +4 volts to about +5 volts. Note that the activation of PR causes its inverse signal on line 154 to turn off a transistor 156 which normally couples the sources of all the contact devices like device 106 in both the forward and feedback matrices to a ground line 158. Thus all sources of all contacts are floated during programming.

In an actual embodiment, the transistor 154 could be omitted so that the OR gate 98 drives the select transistors such as the device 110 on and off by coupling +5 volts or 0 volts to the gates thereof. This more desirable since the turn-on and turn-off times are symmetrical. Those skilled in the art will appreciate this point. In embodiments using the transistor 154, a charge pump would be used to generate the +15 volt supply voltage rather than an extra, external power supply. The details of such charge pumps are well known.

In other equivalent embodiments, the programming of both the forward and feedback matrices may be done in a different manner. One equivalent embodiment would program the contacts by turning on the select devices and grounding the top gates of the contact devices for a time greater than necessary for programming and then apply a +15 volt programming pulse of the desired duration to the target line. Another equivalent embodiment would apply +15 volts to the target lines and turn on the select devices, both acts being carried out for a time greater than necessary to perform the programming, and then apply a pulse going from +5 volts to 0 volts for the proper duration to the top gates of the contact devices.

According to the learning rule for the feedback matrix, all contacts which are coupled to the feedback line for a target line which has converged, e.g., the feedback line 160, and which are also coupled to a target line which has converged are programmed. To illustrate how this is done assume that target line 108 and a target line 162 have converged but that the sum of the convergence responses on a target line 164 were not sufficient to have caused it to coverage. Thus the convergence of target line 108 will cause programming of the contact 104 and a contact 166 but no programming of the contact 168 will be caused according to the learning rule.

The PR signal will be activated by the control logic during programming of the feedback matrix and this will cause the transistor 156 to float the sources of all the contact devices in the feedback matrix. Likewise, the activation of the PR signal will cause the transistors 130 for every target line which has converged to be driven to the +15 volt level by the action of the AND gate 126. Further, the activation of the PR signal drives all the top gates of contact devices in the feedback matrix to 0 volts through the action of the transistor 134 which couples all the top gates to ground via the programming line 136.

Likewise, the activation of the PR signal on line 120 will cause the OR gate 150 to turn on the transistors such as the device 170 coupling a +15 volt source to each feedback line such as the line 172. Only the feedback lines for target lines which have converged will be driven to +15 volts, however. This is because of the action of an OR gate 174 and an AND gate 176 acting under the influence of the flip flop 116 and the PPF signal. The AND gate will drive its output line 178 to logic 1 only if the target line 108 has converged and the flip flop has been set and only when, simultaneously, the PPF signal is activated. When line 178 is a logic 1, the feedback line 172 is allowed to stay at the +15 volt programming level for the duration of the PPF feedback matrix programming pulse. If target line 108 has not converged, the flip flop 116 will not be set, line 118 will be logic zero, and the AND gate 176 will block passage of the PPF pulse. Line 178 will be a logic 0 in this case. An AND gate will also keep its output line 182 at a logic zero because PR* is a logic 0 during programming. Thus OR gate 174 will drive the feedback line 172 to logic 0, sinking the current from the source of the transistor 170 and maintaining the feedback line at a 0 volt level. This prevents any programming of feedback matrix contacts coupled to feedback lines which have not converged. In the preferred embodiment, the control logic will activate the PP and PPF pulses simultaneously, but in other embodiments they may be back to back or separated in time as long as the PR signal is activated before the first of PP or PPF activates and stay activated until the last of PP or PPF deactivates.

Only the contact structures of the reverse matrix which are selected according to the learning rule are programmed by the above circuitry. This is because, only the feedback lines that are coupled to target lines which have converged have +15 volts on them. Target lines which have not converged do not have their flip flops 116 set. Thus the AND gate 176 and OR gate 174 associated with the particular target line combine to sink the current from the transistor 170 for the corresponding feedback line so as to maintain the feedback line at 0 volts. This prevents any contact coupled to the feedback line corresponding to a target line which has not converged from being programmed.

For feedback lines corresponding to target lines which have converged, +15 volts is applied (some alternative embodiments will only apply +5 volts to keep turn-on and turn-off time equal). However, only contacts on these "activated" feedback lines which are also coupled to a target line which has converged will be programmed. This is insured by the action of the AND gates 126 and the transistors 130 associated with the target lines which are converged in driving these target lines to +15 volts. For the example assumed above, the target lines 108 and 162 would have +15 volts applied thereto after they converged and were to be programmed, but target line 164 would not be at +15 volts since the flip flop 116 associated with target line 164 would not be set. Thus line 118 for target line 164 would be logic 0, thereby blocking PR, through the associated AND gate 126, from turning on the corresponding transistor 130 and applying +15 volts to target line 164. Because, the flip-flop 116 for target line 164 would not be set (it is reset by the signal RC for presetting the system before the beginning of every read cycle), the line 194 would be a logic 1. This would pass the PR signal through an AND gate 196 and the OR gate 190 to turn on the transistor 192 for the target line 164 thereby founding this target line. As a result, only contacts 104 and 166 would be programmed, and contact 168 would not be programmed.

This aspect of the structure is important in enabling it to recognize input patterns where portions of the input pattern are missing. Each target line which converges causes programming of the feedback matrix contacts coupled between the corresponding feedback line and all the other target lines which also have converged. Thus, the matrix not only learns the output pattern or vector of the event learned by programming of the forward matrix contacts coupled to active input lines and converged target lines, but also learns the relationships between the target lines which have converged for a particular event. For example, the matrix learns in the forward matrix that for a particular event characterized by a particular input pattern of active input lines, target lines 1, 3, 4, 6 and 9 will converge. The programming of the feedback matrix adds to the total convergence response of each target line which converges an additional feedback convergence response. The magnitude of this additional feedback convergence response is equal to the sum of the convergence responses caused on the target line of interest by contacts in the feedback matrix which have been programmed in response to the convergence of the other target lines. The result is that for the assumed event, if target lines 1, 4, 6 and 9 have converged but the portion of the input pattern which caused the convergence of target line 3 is missing or partially missing, the additional convergence response caused by the feedback matrix programming when target lines 1, 4, 6 and 9 fire will cause target line 3 to converge. Thus the matrix will insure that if target lines 1, 4, 6 and 9 have converged, then target line 3 should also converge if enough convergence response is generated in the forward matrix on target line number 3.

This added feedback convergence response happens in the read mode when PR is inactive, and PR* is a logic one on a line 20. This causes the AND gate 180 to pass the convergence pulse 112 through to the OR gate 174 thereby sending the convergence pulse 112 down the feedback line 172 and turning on all the select devices in the contacts coupled to the feedback line 172. Any of the contacts coupled to the feedback line 172 which have been programmed then cause feedback convergence responses on their associated target lines in addition to the convergence responses caused by the contacts in the forward matrix. The feedback convergence responses have magnitude which correspond to the level of charge which has been programmed onto the floating gates in prior learning episodes. Thus, if in the hypothetical example given, target line 3 did not converge because of missing portions of the input pattern, but the feedback convergence response on target line 3 caused by the convergences of the other target lines in the pattern was sufficient to exceed the current threshold, theta, then target line 3 will converge.

Figure 5:
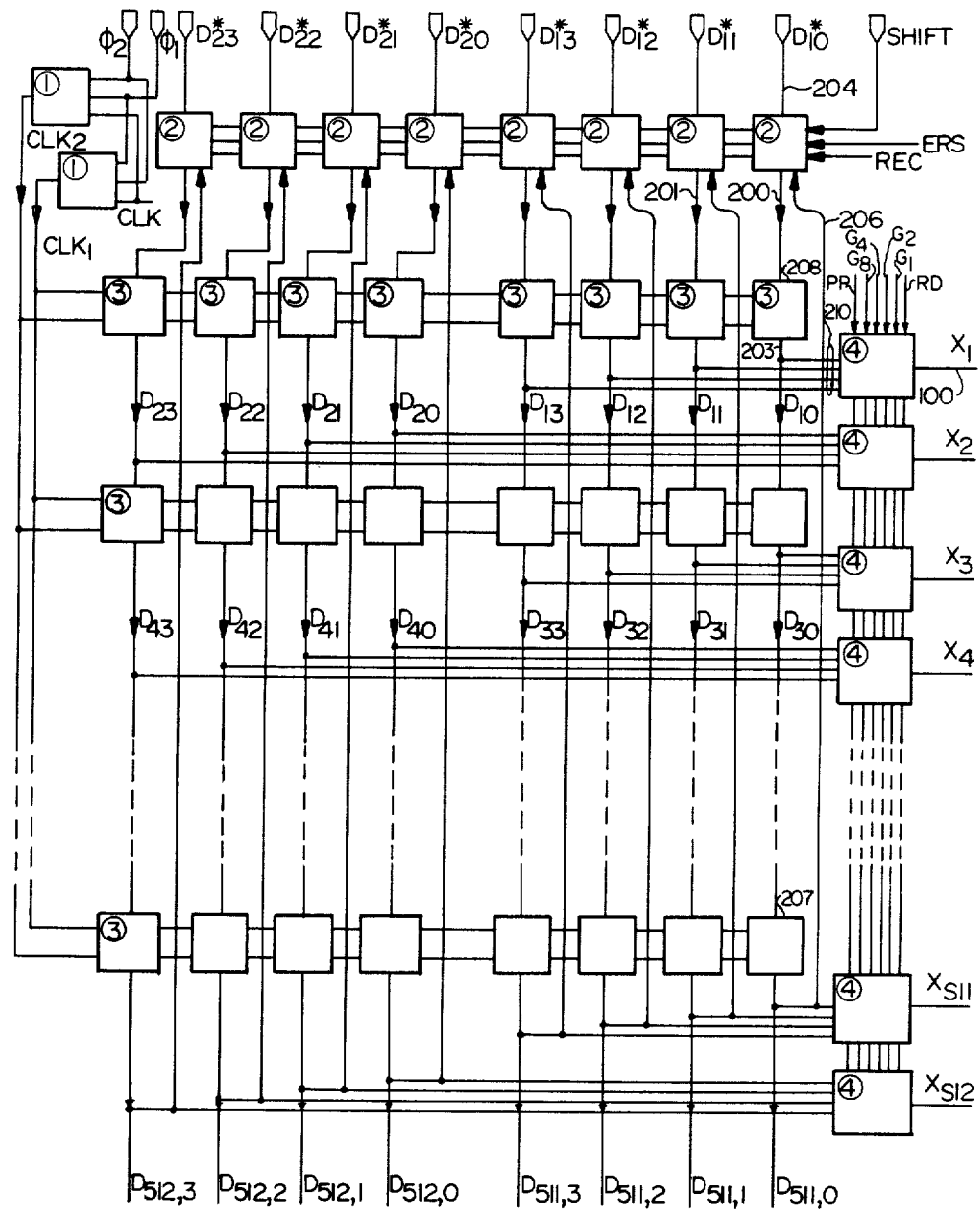
FIG. 5 is a block diagram for an input buffer for multibit pixels or other input data which has analog values from 0 to 15.

Referring to FIG. 5 there is shown a block diagram for the input buffer 20 of FIG. 1 for multivalue pixels, i.e., pixels which may have values other than 0 and 1. The binary data bits which define the analog value of each pixel arrive on signal lines designated $D^*_{1,0}$, $D^*_{1,1}$ etc. from the output of analog to digital converters. The annotation for each bit indicates from which pixel it originates and which bit in that pixel value it is. For example, $D^*_{1,0}$ is the $2^0$ bit of the first pixel, and $D^*_{511,1}$ is the $2^1$ bit of the 511th pixel.

Figure 7:
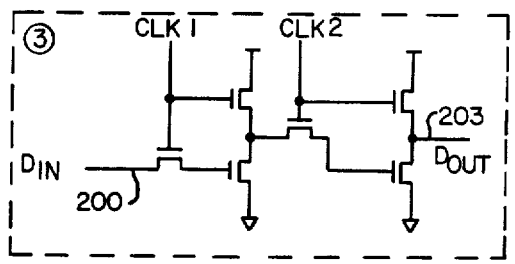
FIG. 7 is a schematic diagram for the typical shift register cell labelled 3 in FIG. 5.
Figure 8:
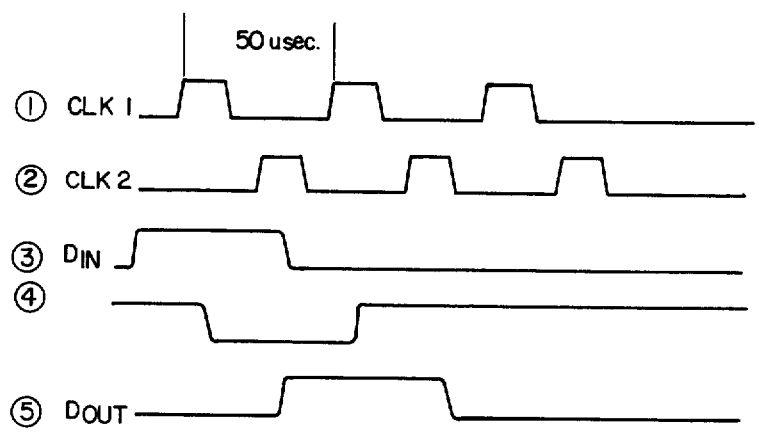
FIG. 8 is a timing diagram illustrating the typical clocking and shifting action of the shift register cell of FIG. 7.

The function of the circuitry of FIG. 5 is to shift in the pixel pattern for the entire frame and store it long enough that the machine can go through its recognize routine. A further function of the circuitry of FIG. 5 is to convert the multibit binary value for each pixel into an input pulse having a pulse width which corresponds to the analog equivalent of the binary value of the pixel. The shifting and storing function is implemented by the blocks labelled with circled 2's and circled 3's under the influence of clock signals generated by the blocks labelled with circled 1's and under control of the control signals SHIFT, ERS and REC. The blocks labelled 2, convert the bits $D^*_{j,k}$ from the outside word sensors into signals which may be shifted into the shift registers. The shift registers are comprised of the blocks labelled 3 which are coupled in series to shift in an entire column of pixels. The shift register inputs are the lines 200, 201 etc. FIG. 7 shows the internal circuitry of the shift register blocks labelled 3. Each is driven by a two phase clock, and the timing of the shifting is as shown in FIG. 8. The clock generator blocks may be of any design which can produce the clock signals as shown on time lines 1 and 2 in FIG. 8. The $D_{out}$ signal on time line 5 emerges on lines such as line 203 in FIG. 5, and represents the output when a logic 1 as shown on time line 3 is shifted through the typical shift register cell. The $D_{out}$ signal is stable for 2 milliseconds after the clocks pulses on time lines 1 and 2 have stopped the shifting activity. For a clock frequency of 20 megahertz, one full frame of 512 pixels may be shifted in in 256 clock cycles or 12.8 microseconds. In alternative embodiments, the input buffer could be pipelines or "ping ponged". In such an arrangement, one buffer could be receiving new input data for a new event while the other buffer was inputting the waves of input signals needed for processing the event characterized by the data stored therein.

Figure 6:
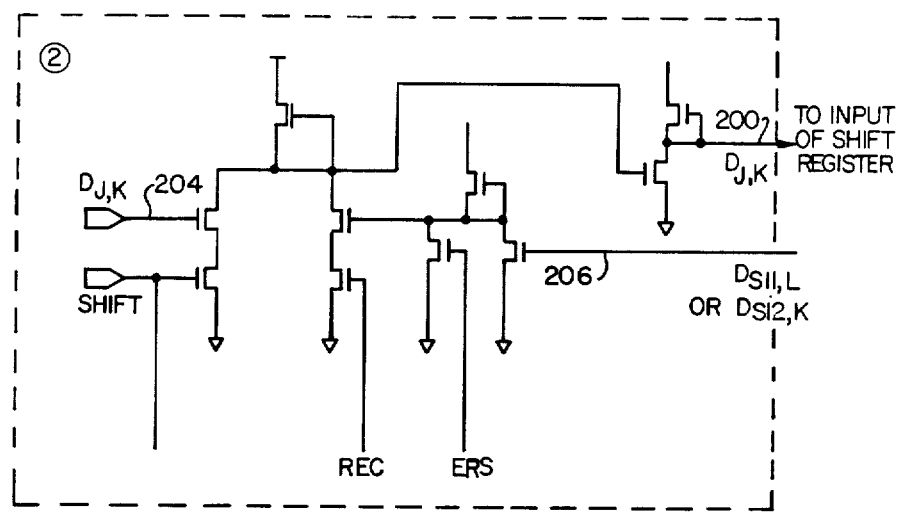
FIG. 6 is schematic diagram of the input blocks labelled 2 in FIG. 5.

The circuitry of the blocks labelled 2 is typified by the schematic diagram of FIG. 6. The data appearing on the input line 204 appears on the output line 200 when the SHIFT signal occurs. In normal operation when the data from a frame is being shifted in, the signals REC and ERS are both logic 0. When the matrix programming is to be erased, all logic 1's must appear on the input lines 100 to the forward matrix so that all the select devices of all contacts will be turned on. To accomplish this state, both a signal ERS and a signal REC are activated for 256 clock cycles to shift all logic 1's into the shift register. To refresh the shift register, ERS is set to logic 0 and REC is set to logic 1 and SHIFT is set to logic 0. The clock is then allowed to run for 256 clock cycles in this condition such that the data on line 206 from the output of the last cell 207 in the shift register is shifted back into the first cell 208 of the shift register.

Figure 9:
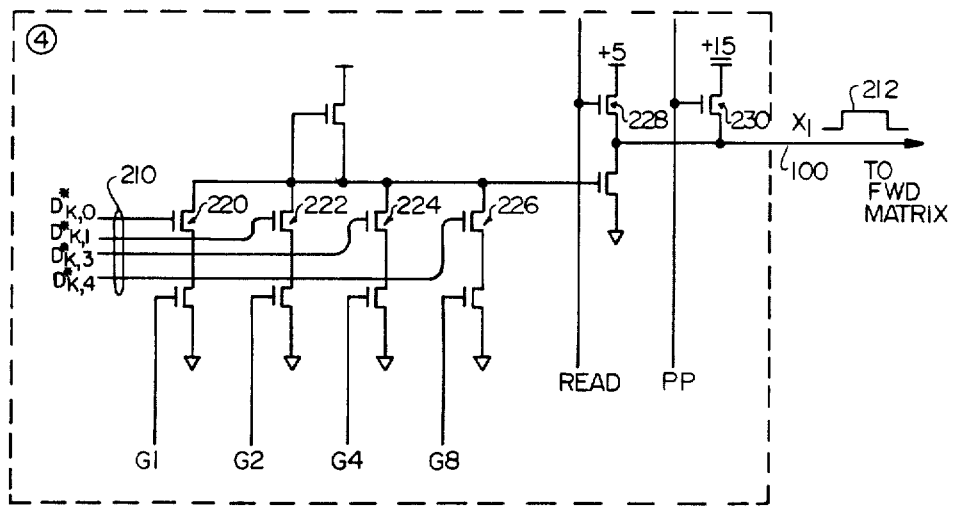
FIG. 9 is a schematic diagram of the block labelled 4 in FIG. 5 used for conversion of the input data into a pulse having a duration proportional to the analog value of the input data.

Referring to FIG. 9 there is shown a circuit diagram for the blocks labelled 4 in FIG. 5. The function of this circuit is to convert the binary data on the input bus 210 into a pulse output on the input line 100 to the forward matrix. The pulse width of the output pulse 212 will be proportional to the analog value represented by the data on the bus 210. The manner in which this circuit functions can best be understood by reference to FIG. 10 which is a timing diagram for the waveforms involved in the conversion process. Each of the signals G1, G2, G4 and G8 is a pulse having a specific width. The G1 pulse has a unit length. G2 is twice as long as G1, and G4 in four times as long as G1. G8 is 8 times as long as G1. These signals occur in the order and timing relationship given in FIG. 10. These signals are gated with the data elements of each pixel value $D^*_{k,0-4}$ in the transistors 222, 224, 226 and 228. Any one of the input signals on the bus 210 which is a logic 1 is converted to a pulse having the width of the corresponding one of the pulses G1, G2, G4 or G8. If more than one of the input bits is a one, then more than one output pulse on the line 100 will occur. For example, if the analog value of the pixel is 9, then the bits $D^*_{k,3}$ and $D^*_{k,0}$ will be on. This will result in an output pulse of the duration of G1, about 50 nanoseconds, followed by an output pulse of the duration of G8, or about 8×50 nanoseconds. The total duration of output pulses at a +5 volt level is 9×50 nanoseconds.

Figure 10:
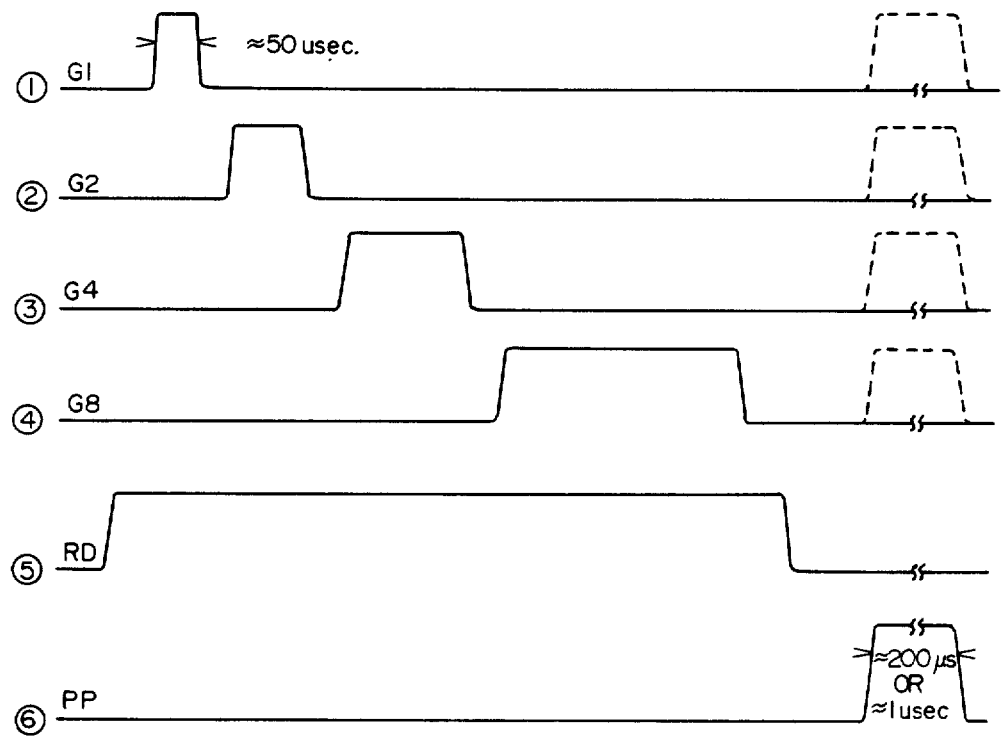
FIG. 10 is a timing diagram of the signals which drive the circuit of FIG. 9 and cause it to perform its function.

During normal reading of the input signals characterizing the event, the RD signal coupled to the gate of the transistor 228 is active, and the programming pulse PP is inactive as seen from time lines 5 and 6 of FIG. 10. This gates the output pulses through to the line 100. During normal programming, the PP signal is activated by the control logic for approximately 200 microseconds. This turns on the transistor 230, and gates +15 volts onto the line 100 to turn on the select devices in the forward matrix. During erasure of the information in the matrices, PP is activated by the control logic for approximately one millisecond.

The Recognition Process

Recognition is an associative process to identify an unknown event by comparing its characteristics to the learned characteristics of other events which have been previously committed to memory. In the recognition process, a set of input stimuli from an unknown event are associated in the matrix of the invention with the records of events which have been previously learned. The resultant output vector is compared to the output vectors of events which have been previously learned to identify the event which caused the input stimuli.

After the matrix has been programmed as previously described, there exists a record of the characteristics of the event learned in the matrix. This record manifests itself as a two dimensional spatial distribution of charge on the floating gates in the contact structures in the preferred embodiment. In alternative embodiments, this two dimensional spatial distribution may take other forms in the sense that "permanent" changes in the characteristics of the contacts are made in response to the input stimuli.

The changes to the contacts are not permanent in the preferred embodiment since the entire matrix record may be erased by assertion of the ERASE signal on line 140 in FIG. 4. The activation of the ERASE signal on the line 144 causes the transistor 144 to couple a +15 volt voltage source to the program line 136 thereby driving the top gates of all the contact devices to +15 volts. Simultaneously, an OR gate 190 for each target line couples the logic 1 of the ERASE signal activation to the gate of a transistor 192 for each target line in the matrix which grounds the target line 108 and all the other target lines. Likewise, the ERASE signal activation causes the OR gate 150 for each target line to turn on the transistors 170 and 154 thereby applying +15 volts to the input lines of the forward matrix such as the line 100 and to the feedback lines such as line 172. During the erase process, the PP and PPF signals must be activated to turn on all the select devices so that the reverse tunneling may occur. Reverse tunneling then occurs because of the reversal of the orientation of the field from the floating gate to the drain region of all the contact devices. This causes the charge stored on the floating gates to tunnel through the thin oxide thereby discharging all floating gates. The above events happen for each contact in the foward and reverse matrix thereby deprogramming the entire device. This prepares the device to learn an entirely new set of events.

In alternative embodiments, each contact causes a convergence response which may be measured and summed. These changes in contacts which embody the learning process are generally changes to any characteristic of the contacts which alter the magnitudes of the convergence responses so as to increase the magnitude of the response. Some embodiments may also decrease the magnitude of the responses or selected responses according to some criteria such as convergence or lack thereof.

Figure 11:
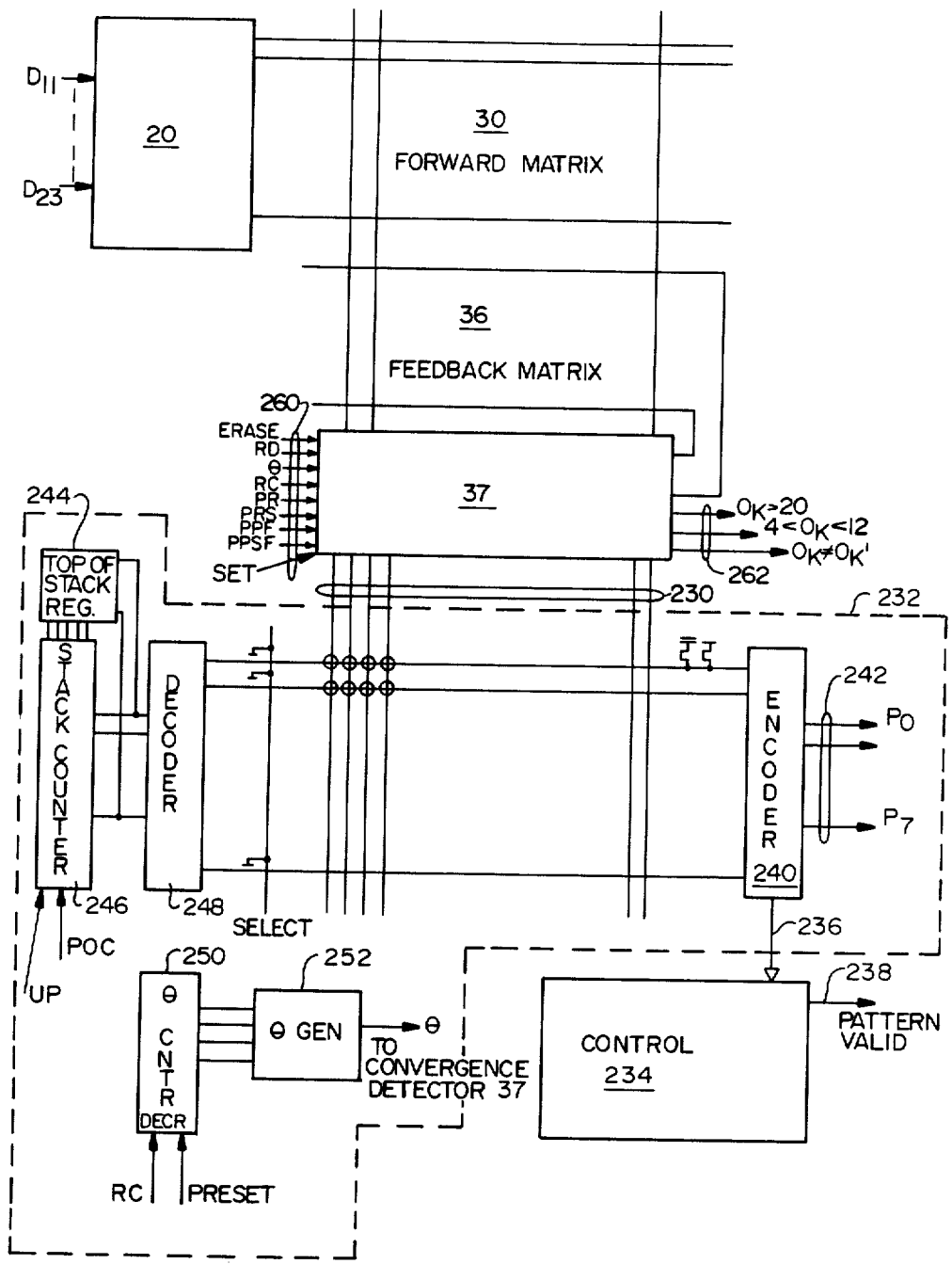
FIG. 11 is a block diagram of the learning and recognition system in accordance with the teachings of the invention.

Referring to FIG. 11, there is shown the basic architecture of the preferred embodiment of a system in accordance with teachings of the invention. The input buffer 20 is structured as in FIG. 5. The forward matrix 30 and feedback matrix 36 are structured as shown in FIG. 4. The convergence detecting and programming circuit 37 is structured somewhat differently than the structure of FIG. 4 to account for processing of false positive cases in the learning mode. These differences will be explained later. The Q and Q* outputs of each convergence flip flop like flip flop 116 in FIG. 4 for every target line are collected on a bus 230, and applied to the inputs of a pattern comparator 232.

The pattern comparator compares the pattern of active and inactive signals on the bus 230 to the known patterns of events previously learned. When the pattern on the bus 230 matches the pattern of an event previously learned, then the control logic 234 is signaled via line 236, and a PATTERN VALID signal is output on the line 238. An encoder 240 encodes the recognized pattern into an identification code on the output bus 242 to inform the user of the identity of the event. The top of stack register 244 and the stack counter 246 and decoder 248 are all used in a manner to be described below to program the patterns of learned events into the pattern comparator 232. Recognition cycles are carried out with the aid of a theta counter 250 and a theta generator 252 in the form of a digital to analog converter. The theta counter 250 establishes an initial high count for theta when the PRESET signal is activated to establish an initially high convergence threshold. Subsequent pulses of the DWN signal cause the counter 250 to decrement the count and thus lower the convergence threshold.

Figure 12:
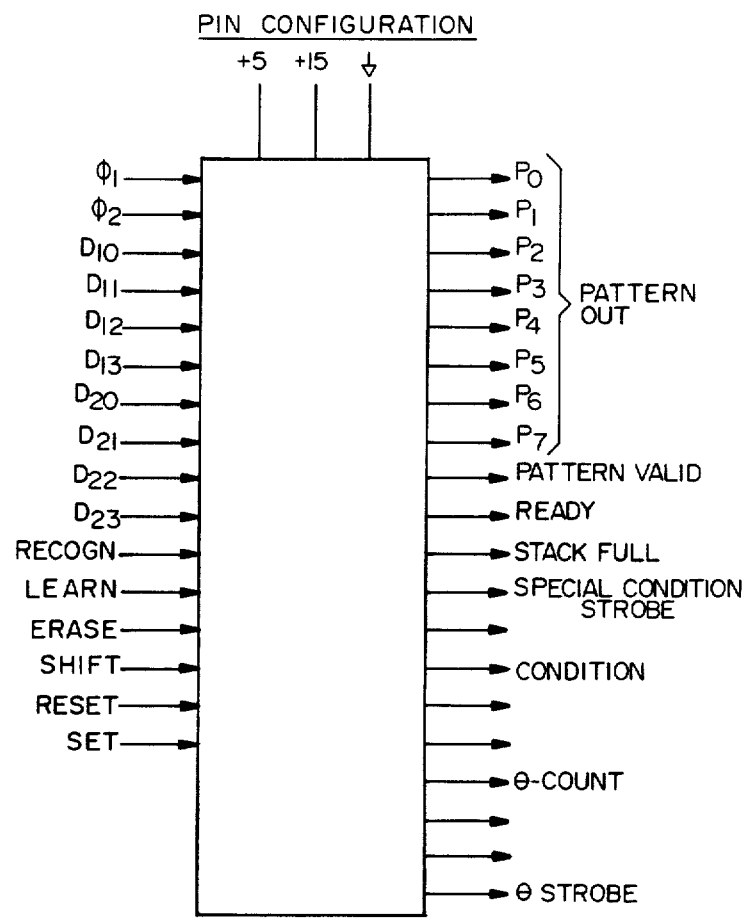
FIG. 12 is a diagram of the signals available to the user in an integrated circuit form of the invention.

The signals on the control bus 260 originate from the control logic 234 except for the ERASE signal which is a signal activated by the user. Some of the control signals are necessary for the programming in the false positive case which will be described below. The other signals to which the user has access are shown on the pin out diagram of FIG. 12. The signals on the control bus 262 are generated by logic in the convergence detecting and programming logic 37 to indicate the size of the output, i.e., how many of the target lines have converged for any given output. These signals are used by the control logic 234 in the learn mode and in the recognize mode for various purposes which will become clear when the algorithm for these modes which is implemented by the control logic is described.

Figure 13:
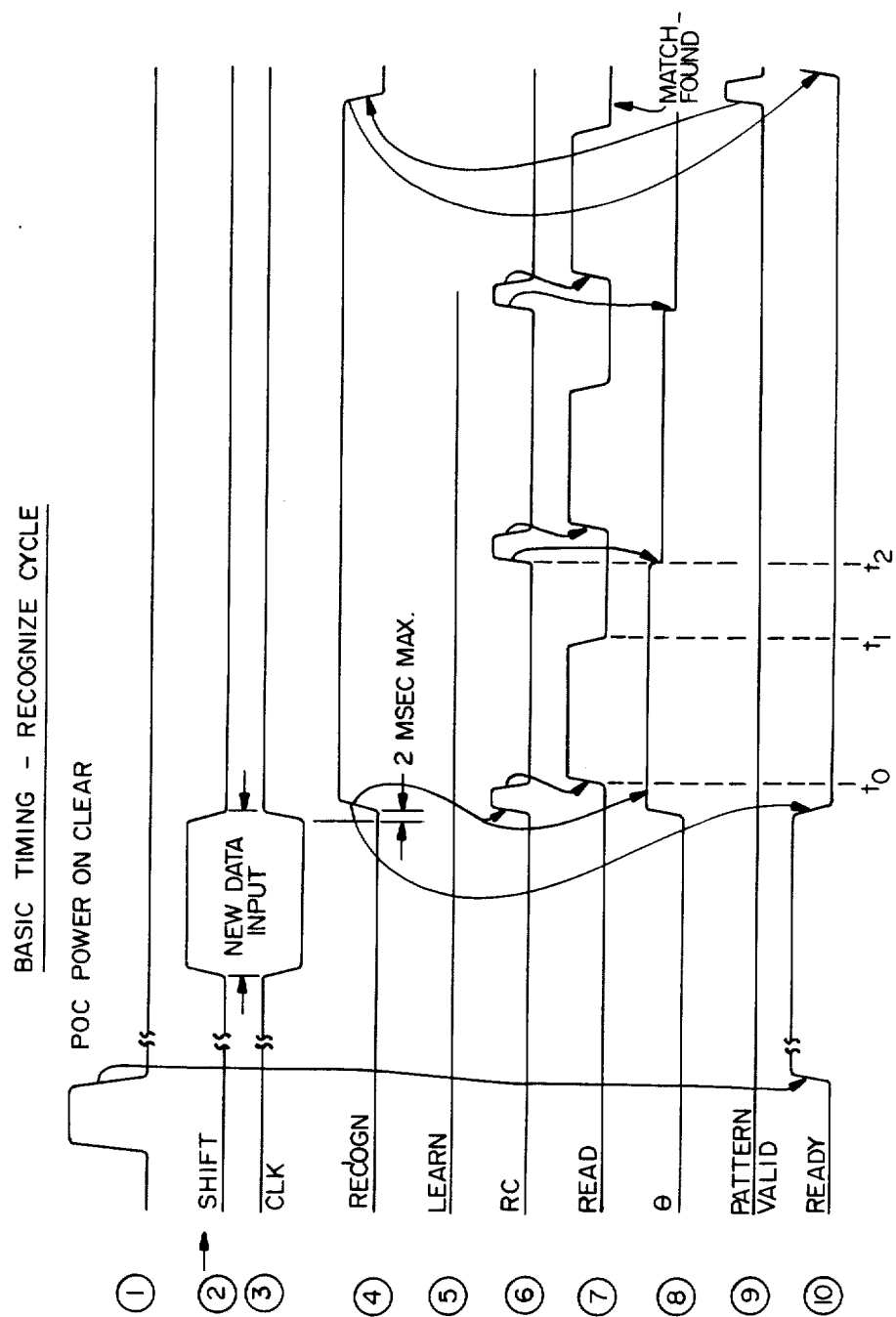
FIG. 13 is a timing diagram of the basic timing of the recognition cycle.

Referring to FIG. 13 there is shown the basic timing of a recognize or read cycle. Recognize cycles may be performed after the characteristics of one or more events have been learned. At power on time, a power on clear (hereafter sometimes referred to as the POC pulse) pulse illustrated on time line 1 is issued by the control logic. This pulse clears all the flip flops like flip flop 116 in FIG. 4, and intializes the stack counter 246 in FIG. 11 to the top of the stack. Power on clear may also be used to clear the input buffer 20, but this is optional. At the end of the POC pulse, the READY signal is sent to the user indicating that the system is ready to do a recognition cycle.

The first step is to shift in the data characterizing the event to be recognized. This is done by the input buffer 20 of FIG. 5 as previously described by user activation of the SHIFT signal for 256 clock cycles as shown on time line 2. The duration of SHIFT may differ in embodiments having larger or smaller input buffers and larger or smaller forward matrices.

After the data are in the input buffer, the system is ready to examine the pixel data. This process is implemented by the user's activation of the RECOGN signal as shown on time line 4. The user has up to 2 milliseconds to activate RECOGN after the data has been shifted into the input buffer, because this is the amount of time for which the data in the input buffer are stable. After 2 milliseconds, the data must be recirculated to refresh it. RECOGN may not be activated before all the data has been shifted into the input buffer.

The user's activation of RECOGN causes the control logic 234 to issue an RC pulse as shown on time line 6. This RC pulse resets all the convergence flip flops 16 in FIG. 4 for every target line and causes all the transistors like the transistor 270 in FIG. 4 to connect their respective target lines to a +5 volt voltage source to precharge the integrating capacitance of the target lines. After all this has been done, the RC pulse trailing edge causes the control logic 234 to activate the READ signal. This causes all the pixel data to be converted into corresponding duration input pulses on the input lines $X_1$ through $X_{512}$ in FIG. 5. All the pixels are examined simultaneously. The duration of the READ pulse should be sufficient to allow the process of conversion of the pixel data to the corresponding width pulses to have occurred and for these pulses to have propagated through the forward matrix and to have caused all the discharge of the target lines by contacts in the forward matrix to have occurred. This all must have occurred between times $t_0$ and $t_1$ in FIG. 13. The next RC pulse must not occur before time $t_2$ which marks the time at which all the feedback convergence responses will have occurred, i.e., the additional time needed for the converged target lines to have caused any feedback responses and for any further convergence caused by the waves of feedback signals. Further, all the comparisons between the convergence pattern or output vector on the bus 230 and the known patterns should also have been completed by time $t_2$.

The first activation of the RC pulse also causes the convergence threshold theta shown on time line 8 to be set at its initial value. The initial value is set high to prevent excessive convergence. The system is designed to self adjust the threshold from an initial high value down in small steps until the number of target lines which have converged are within an acceptable range. In the preferred embodiment, the acceptable range is between 4 and 8 for an array of 64 by 64 lines in the forward matrix to learn and between 8 and 20 to recognize. Each subsequent activation of an RC pulse lowers the threshold by a small amount and triggers another precharging of the target lines, another conversion of the input data into pulses having durations proportional to the pixel values and another calculation of convergence. Each recognition cycle resulting in a convergence of between 8 and 20 target lines causes the output pattern on the bus 230 in FIG. 11 to be compared to one of the known patterns stored in the pattern comparator 232. When a mtach is found to a known pattern, the control logic 234 activates the PATTERN VALID signal, and the user may read the code on the bus 242 to identify the event which occurred. In larger embodiments such as 512 by 512 line forward matrix structures, the acceptable range of convergence to learn and event would be higher, such as 8-20 and recognition be in approximately the same ragne. In embodiments which have the false positive learning distinction capability to be described next, the acceptable range of convergence for a 512 by 512 array would probably be from 8 to 13 converged target lines. This would allow for additional convergence of target lines as the difference in the pattern were learned. The false positive circuitry would then cause additional target lines to converge by lowering the threshold until the differences were learned.

False Positive Learning Process Programming Circuitry

A false positive indication can occur during the learn mode when the user puts in a known pattern and the system incorrectly identifies the event as another event which has previously been learned. Part of the learn algorithm is to have the system do a recognition cycle on the pattern to be learned to determine if the event has already been learned. Sometimes when two events are very similar in terms of their input data patterns, the system will incorrectly identify an event to be learned as an event which has already been learned. For example, in a character recognition setting, the system might be asked to learn an O pattern when it has already learned a C pattern. When the O is presented, the system may activate the PATTERN VALID line indicating that the pattern has already been learned. In such an event, the user must tell the system that it is wrong, and teach it the new pattern.

The learning rules for teaching the system the new pattern essentially cause the system to strengthen the learning of the differences between the two patterns. That is, the forward matrix contacts will be programmed, but only those contacts which are coupled to target lines which have converged for the new pattern but which did not converge for the already learned pattern. Assume that the already learned event causes target line convergences that are designated $O'_k$ and the new event causes target line convergences which are designated $O_k$. Then the contacts which are coupled to active input lines and to target lines in the set $O_k - O'_k$ (set theoretic difference) are programmed in the forward matrix. The set theoretic difference of sets A and B is all the elements of A which are elements of B.

The learning rule for the feedback matrix is to program only those contacts which are coupled to a feedback line corresponding to a target line in the set and which are also coupled to target lines in the set $O_k - O'_k$ (set theoretic difference), i.e., the target lines which converged for the new event.

Figure 14:
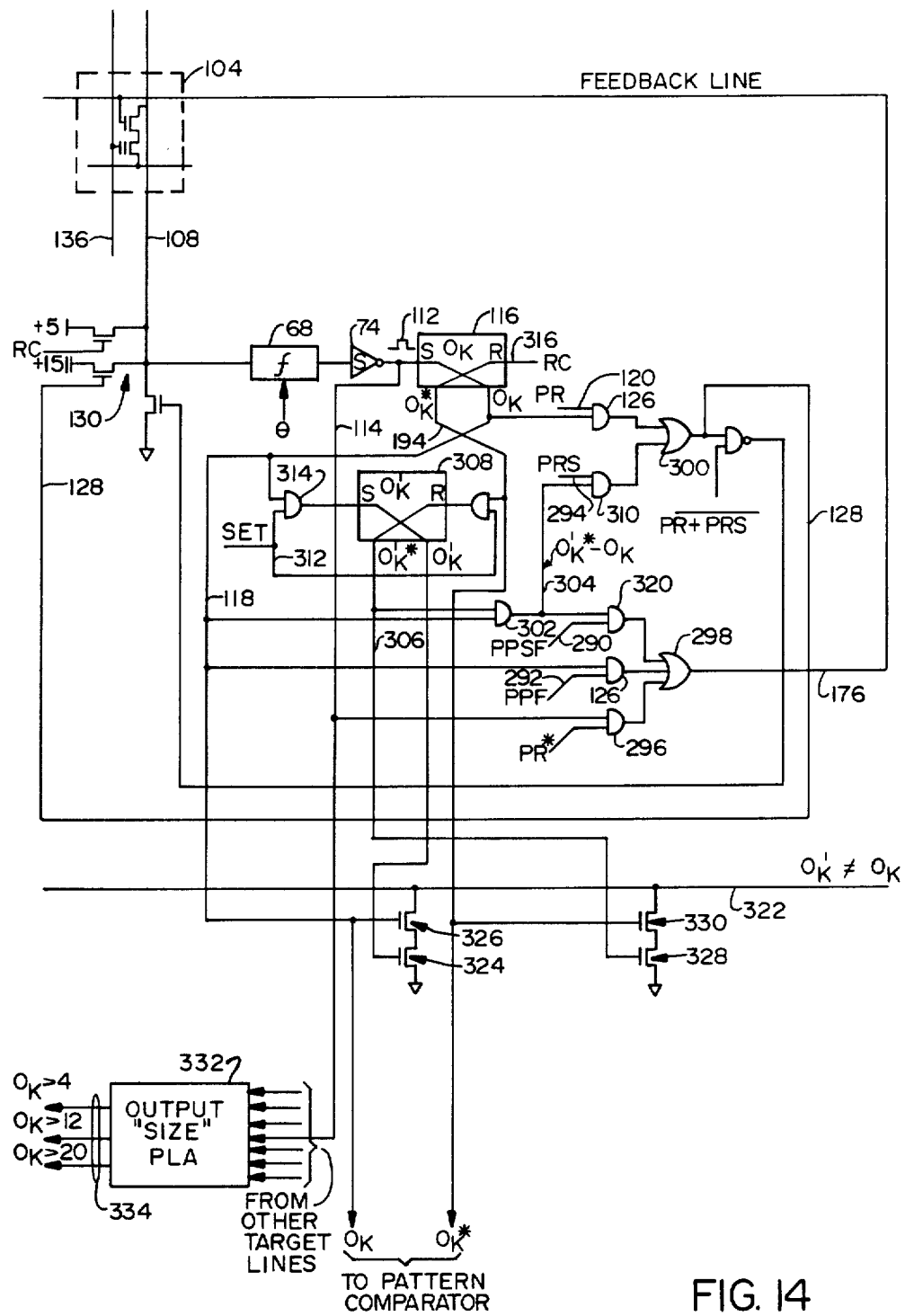
FIG. 14 is a diagram of the convergence detecting system and programming circuitry of the preferred embodiment of the invention to handle the false positive learning mode case.

These two learning rules are implemented by the circuitry of FIG. 14. Because there are two stages in programming for the special case of a false positive indication, special control signals must be generated for programming the forward matrix and for programming the feedback matrix. The PPSF signal on line 290 stands for "programming pulse special feedback" and programs the feedback matrix in the false positive case. The PPF signal on line 292 is the program pulse for the feedback matrix in normal programming. The PR signal is the same signal as the PR signal in FIG. 4, and the PRS signal on line 294 serves the same purpose as the PR signal except for the special case of a false positive indication. The signal PR'* is a gated PR signal which is held at logic 0 during programming in the false positive special programming case. It is a logic one when programming is not occurring, and the control logic is in a state to allow the feedback convergence responses to be generated in the feedback matrix as a result of convergence of target lines. This signal PR'* causes the AND gate 296 to allow the convergence pulse on the line 114 to pass through the gate 296, through the OR gate 298 and onto the feedback line 176.

Programming in the normal case occurs when the flip flop 116 is set, and a logic one exists on the line 118. The pulse PPF will then cause the proper voltage condition to occur on the feedback line 176 as described above for FIG. 4. The target line 108 will be driven to +15 volts by the action of the PR signal on line 120, the AND gate 126, the OR gate 300, the line 128 and the transistor 130 as described in FIG. 4 if the target line 108 has converged and the flip flop is set such that line 118 is a logic one. The top gate line 136 is driven in the same manner in either the normal programming or the false positive case programming cases.

Special case programming for the forward matrix occurs only on target lines which converged in the second event which did not converged in the first event. This condition is determined by the AND gate 302 whose output on the line 304 is the function $O_k-O'_k$. The AND gate 302 has its inputs coupled to the $O'^*_k$ (Q not) output 306 of a flip flop 308 and the $O_k$ (Q) output 118 of the flip flop 116. When the target line 108 converges on the second event but did not converge on the first event, the flip flop 116 will be set, but the flip flop 308 will not be set. Thus lines 118 and 306 will both be logic 1, and the AND gate 302 will output a logic 1 on the line 304. This causes an AND gate 310 to pass the PRS programming signal through to the OR gate 300 which passes it through to the line 128 thereby driving the target line 108 to the programming voltage of +15 volts through the action of the transistor 130.

The manner in which the flip flops 116 and 308 and the AND gate 302 combine to implement the learning rule for the false positive case is best illustrated by example. Suppose the event the user is trying to teach the machine is to recognize an O. Suppose also that the event that the machine had previously learned was a C, and that for the C, the target line firing pattern was 1, 3, 7. Assume that the firing pattern for the target lines for a O is 1, 3, 4 and 7. Now assume that at some particular threshold level for theta, the output firing pattern for the O was 1, 3 and 7. At that time the system would falsely identify the O as an C. This is what is called the "false positive" response. Suppose also that the circuit of FIG. 14 represents the circuitry for target line number 4, although all target lines have the same circuitry. The user would recognize the fact of the false identification and activate the SET signal on the line 312. This would transfer the contents of the flip flop 116 into the flip flop 308. Since target line 4 did not converge at the then current threshold level, there would be a logic 0 on the line 118, and the AND gate 314 would pass a logic 0 to the set input of the flip flop 308. Flip flop 308 would remain not set, and the $O'_k$ output signal on line 306 would remain a zero. The SET signal is then dactivated, and the flip 116 is reset by the RC signal on the line 316. Activation of the RC signal would also lower the convergence threshold theta by one more increment. This means that if 9 units of convergence response were required at the previous threshold level, only 8 units of convergence response would be needed at the new lower threshold (or whatever the step size is in terms of some "unit" of convergence response). In reality, this amounts to changing the theta voltage such that the voltage on the integrating capacitance of the target line has to drop less to cause the target line to converge.

Suppose now that for the next two lower thresholds, target line 4 still does not converge, and flip flop 116 still does not get set. No difference in the firing pattern will have emerged during these two read cycles, so not learning or programming of either matrix is desired. New programming is desired only for the "difference" target lines ($O_k-O'_k$ set theoretic difference) when such a difference appears. Since the flip flop 308 is storing a logic 0 and the flip flop also storing a logic 0, the AND gate 302 output will be a logic 0 thereby causing the AND gate 310 to block any PRS signal from causing any programming on target line 4 during these two cycles.

Now suppose that on the third read cycle, the convergence threshold has reached a low enough level, that target line 4 converges. In this case, flip flop 116 will be set by the pulse 112 from the one shot 74, and the flip flop 308 will still be storing a logic 0. The result will be that the flip flop output lines 118 and 306 will both be a logic 1, and the AND gate 302 will output a logic 1 on the line 304. This causes the AND gate 310 to pass the PRS programming pulse to thereby cause the proper voltage condition, +15 volts, on target line 4 to cause all contacts thereon with active input lines to be programmed.

Figure 15:
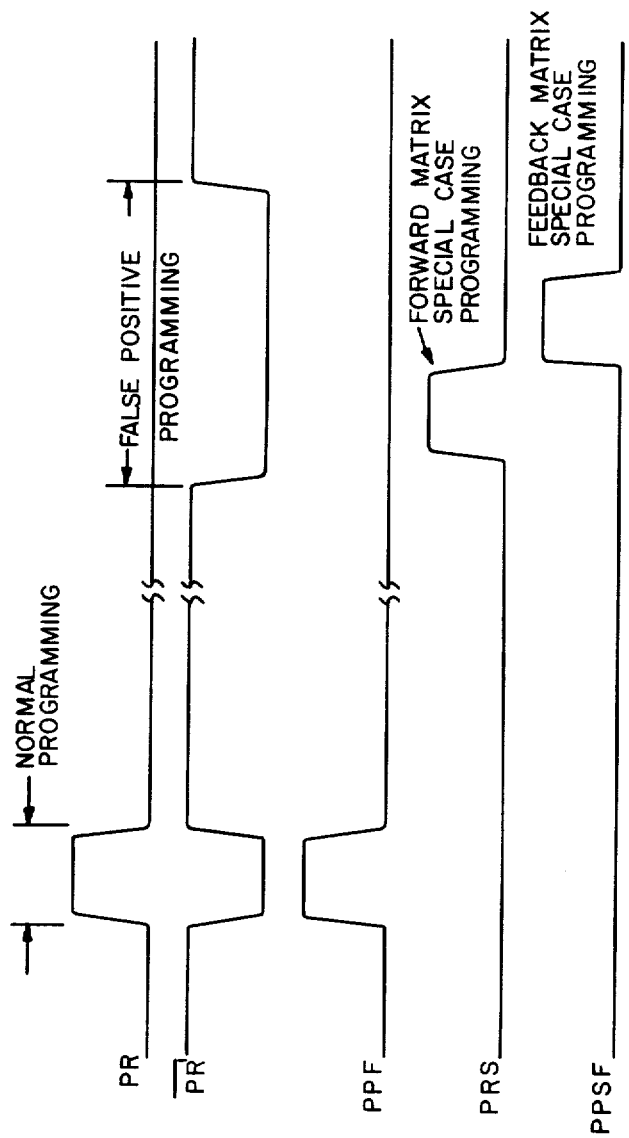
FIG. 15 is a timing diagram of the control signals for implementing the false positive learning process.

Programming of the feedback matrix for the special false positive case occurs after programming of the forward matrix for the special false positive case. The timing diagram for the signals involved in the special case programming is given in the timing diagram of FIG. 15. After completion of special case forward matrix programming on the difference lines, the contacts coupled to the feedback lines corresponding to the difference lines are programmed if they are also coupled to a target line which converged when the difference appeared. To program these contacts, the flip flops 116 and 308 and the AND gate 302 combine as described above to apply +15 volts to only the difference target lines. The difference signal on the line 304 from the output of the AND gate 302 indicates that the particular target line associated therewith is a converged difference line. Thus its corresponding feedback line must have +15 volts applied thereto, or at least a logic 1 level so as to turn on the select devices of all the contacts such as 104 coupled to the feedback line. The AND gate 320 accomplishes this function by passing the PPSF programming pulse for the feedback matrix in the special case if the signal at the output of the AND gate 302 is a logic 1. This completes all the necessary programming for the special case.

The control logic must be informed when the difference between $O_k$ and $O'_k$ first occurs. The control signal $O_k$ NOT EQUAL TO $O'_k$ on line 322 informs the control logic of this fact. This line is pulled up by a transistor not shown to a logic 1 level. By the action of the transistors 324, 326, 328, and 330, the signal on line 322 is kept low as long as the flip flops 116 and 308 are in the same state. When they are in opposite states, the line 322 goes high.

For purposes of the control algorithm, the control logic must also know how many of the target lines have converged. This information is generated in the form of the control signals on the bus 334 which are generated by the output size calculation logic 332. This logic is typically a "neuristor" such as is shown in FIG. 4 having the output of each target line coupled to a contact on the target line and having its threshold theta fixed at a value such that if the number of target lines which have converged is equal to or greater than the lower limit which the control logic needs to be informed of, then the target line will converge. Another neuristor would be used for the upper limit if necessary and would have all the target lines coupled to contacts on this neuristor and would have its threshold theta set so that unless the number of converged target lines was equal to or greater than the upper limit, no convergence would occur. A decoder could then be coupled to the outputs of these two limit detecting neuristors to generate the needed control signals to indicate output size. In alternative embodiments, a ROM or PLA could be used or any other logic or hardware/software combination which can calculate the size of the output. This logic is coupled to the outputs of the one shots 74 for every target line.

Figure 16:
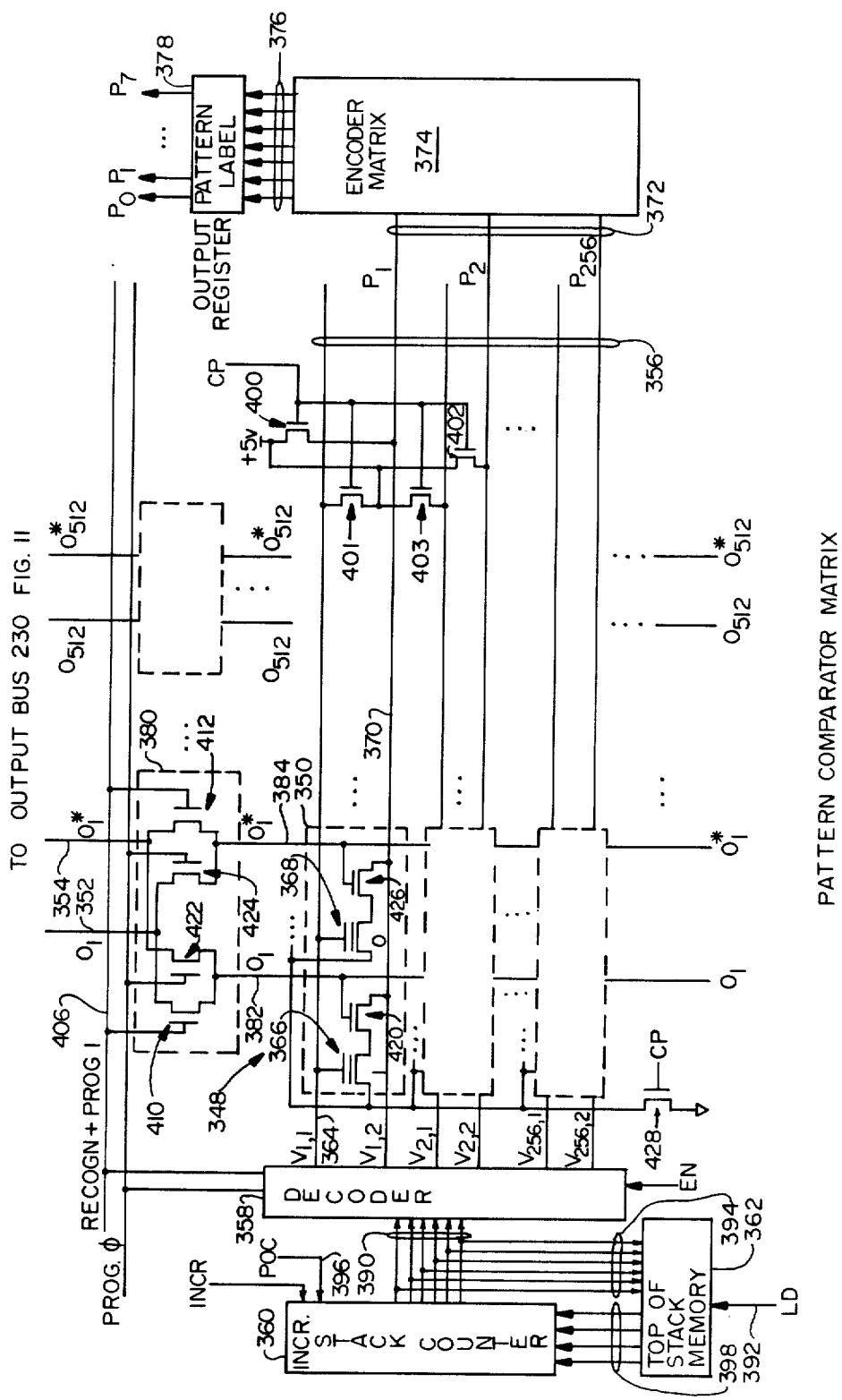
FIG. 16 is a schematic diagram of the pattern comparator matrix.

Referring to FIG. 16 there is shown a diagram for one embodiment of the pattern comparator matrix of the invention. The function of the pattern comparator matrix is to simultaneously compare the output pattern or vector on the bus 230 in FIG. 11 to every output pattern identifying events that the system has previously learned. The patterns that the machine has previously learned are programmed into a matrix 348 comprised of a plurality of contact structures 350 like those used in the forward and reverse matrices. Each row of the matrix is programmed with one learned pattern, and there are as many rows as the maximum number of patterns which the machine can store. One set of inputs to the matrix is the group of output signal lines on the bus 230. Another set of inputs to the matrix is a bus 356 comprised of a plurality of pairs of program/read lines, two for each row. These program/read lines are controlled by a decoder 358, a stack counter 360 and a top of stack counter 362. For row number 1, the programming line 364 is coupled to the top gates of all the floating gate transistors in the contact structures in that row such as the transistors 366 and 368. The read line for row number 1 is line 370.

The comparator matrix works in the read mode by comparing the incoming pattern on the bus 230 to the patterns of logic 1's and 0's which have been programmed into the floating gate transistors of each row. The incoming pattern is thus compared to all the stored patterns simultaneously. When a match is found, the read line on the particular row on which the match was found goes low. All the other read lines should be high.

The read lines for each row comprise a bus 372 which is an address or input vector for an encoder matrix 374. The encoder matrix 374 converts the input vector to its corresponding pattern label on an output bus 376. This output label is stored in an output register 378 for later reading by the user to identify the event which caused the match.

There is a contact structure like the contact structure 350 at every intersection between the two lines comprising the column and the two lines comprising the row. For example, for target line 1 there are two outputs $O_1$ and its inverted counterpart $O^*_1$ on lines 352 and 354 entering the pattern comparator matrix. These two column lines enter a multiplexer 380 which is used to switch each of the incoming two lines between connections to either of two outgoing lines 382 and 384. The purpose of the multiplexer is to control the programming of the two floating gate transistors at every intersection of one row and all columns when the pattern comparator matrix is being programmed with a new output vector characterizing an event the user wants the machine to learn.

Programming of the output patterns into the comparator matrix is done by reversing the "normal" state of the floating gate transistors under certain circumstances. The normal state of these transistors is for the "right" transistor to be programmed to logic 0 and the "left" transistor to be programmed to logic 1. The right transistor is the transistor such as the transistor 368 which is coupled to the column line which normally carries the inverted output signal such as the line 384. This translates for the normal state of contact 350 into no charge on the floating gate of transistor 368 and charge on the floating gate of the transistor 366.

The stack counter 360 and the decoder 358 combine in the programming mode to point to the next unprogrammed row which is available to learn a new output pattern. Before any patterns are programmed into the pattern comparator matrix 348, the stack counter outputs a count on a bus 390 which points to row number 1 on which contact 350 resides as the first row available for programming. After row 1 has been programmed, the stack counter 360 is pointing to row number 2 as the next available row for programming. The stack counter 360 is incremented by an INCR signal from the control logic indicating that programming of the first row is completed. The control logic also activates the LD signal on the control line 392 to the top of stack register each time the stack counter 360 is incremented. This loads the current pointer into the non-volatile memory of the top of stack register 362 via the bus 394. The stack counter also receives the POC power on clear signal on control line 396 each time the machine is turned on. This signal causes the stack counter 360 to be preset to the contents of the top of stack memory 362 via the bus 398.

The count on the bus 390 is converted by the decoder 358 to the proper programming voltages on the program line and the read line for the row currently pointed to by the count if the EN enable from the control logic indicates that the programming mode for the pattern comparator matrix is in effect. When the programming mode is not in effect, the decoder 358 places the bus 356 in a high impedance state, and the lines of the bus 372 are pulled up to a logic 1 level by activation of the CP signal from the control logic. The CP signal is coupled to the gates of a plurality of pull up transistors such as the transistors 400 through 404. Each of these transistors, when turned on, couple +5 volts to their respective read or program lines when the incoming pattern is to be compared to all the patterns stored in the pattern comparator matrix. The CP signal is activated by the control logic only when the threshold reaches a level that the output size is within an acceptable range. For a matrix of 512×512, the acceptable range is approximately from 8 to 20 active output lines as far as is presently known.

Programming of a row of the comparator matrix will now be explained by an example. Suppose that row 1 is to be programmed, and output line $O_1$ is a logic 1. The desired programming action is to cause the "normal" state of the floating gate transistors 368 and 366 to be reversed such that transistor 366 has its floating gate discharged, and so that transistor 368 has its floating gate changed. This must be done in two steps.

The first step is to program the left floating gate transistors to change states from logic 1 to logic 0 for every output signal $O_k$ which is a logic 1. To do this, the control logic activates the PROG 1 signal. Because the control line 406 carries the signal RECOGN OR PROG 1, it will be active when either the recognize signal is active or the control logic has activated the PROG 1 signal. This causes transistors 410 and 412 and their counterparts for each column multiplexer to turn on. This applies a logic 1 to the line 382 and a logic 0 to line 384 if output signal $O_1$ is a logic 1. The same is true for every output signal $O_k$ which is a logic 1. For all output signals $O_j$ which are logic 0's, the situation is reversed with a logic 0 being placed on the column line corresponding to line 382 and logic 1's being placed on the column line corresponding to line 384. The decoder 358 is coupled to the control line 406 and knows it is active, and places erase voltage conditions on the pair of program and read lines corresponding to the row currently pointed to by the count on the bus 390. In the case of row 1, the decoder drives line 364 to +15 volts and drives line 370 to 0 volts. This causes the transistors 366 to be erased to a logic 0 state because there is a logic 1 on the line 382 thereby turning on the transistors 420 and coupling the 0 volt level on line 370 to the drain of the transistor 366. These erase program conditions are maintained by the decoder for a sufficiently long period to erase all transistors like transistor 366 on the current row. Any transistors like 366 on the current row which correspond to an output line $O_j$ which is a logic 0 will not be erased, because their corresponding select devices like the device 420 will not be turned on.

The next step is to reverse the state of all the right floating gate transistors corresponding to output lines $O_k$ which are logic 1's. To do this, the control logic activates the PROG 0 signal and deactivates the PROG 1 signal. This causes the transistors 422 and 422 to turn on and causes the transistors 410 and 412 to turn off. As a result, for $O_1$, a logic 0 is applied to the line 382 and a logic 1 is applied to the line 384. The same is true for all other $O_j$ which are logic 0's and the opposite is true for all $O_k$ which are logic 1's. The decoder then senses the activation of PROG 0 and applies programming voltage conditions to the lines 364 and 370. Specifically, line 364 is driven to 0 volts, and line 370 is driven to +15 volts. This causes the transistor 368 and its counterparts associated with other $O_k$ which are logic 1's to be programmed to a logic 1. All output signals $O_j$ which are logic 0's do not have their devices like 368 programmed, because their select devices like the device 426 are not turned on. The foregoing process is repeated for each row, with one output pattern stored in each row.

When an output pattern is to be compared to the stored patterns in the comparator matrix, EN is deactivated as are PROG 0 and PROG 1, and the signal CP is activated. RECOGN is active however in this mode, so the transistors 410 and 412 for every output line $O_1$ through $O_{512}$ will be turned on and all the lines corresponding to the line 382 will be logic 1's for output lines $O_k$ which are logic 1's. Conversely, all lines corresponding to the line 384 will be logic 0's for output lines $O_j$ which are logic 0's. Thus for every row which is not an exact match there will be at least one column where there is a logic 1 on the line corresponding to line 382 and a logic 1 programmed into the device according to transistor 366. Because the signal CP is active, the transistor 428 will be on thereby grounding all the sources of all the floating gate devices in the comparator matrix will be grounded. Thus, on every row which does not exactly match there will be a path to ground that pulls the read line, e.g., line 370, to ground. Conversely, if there is an exact match between the output pattern and the pattern programmed on the row, the read line such as line 370 for that row will remain at a loic 1 level. Thus, if a pattern is recognized, bus 372 will be all logic 0's except on the row which matches the output vector corresponding the input event. The encoder matrix 374 then generates the pattern label and outputs it on the bus 376.

The Recognition Algorithm

Figure 17:
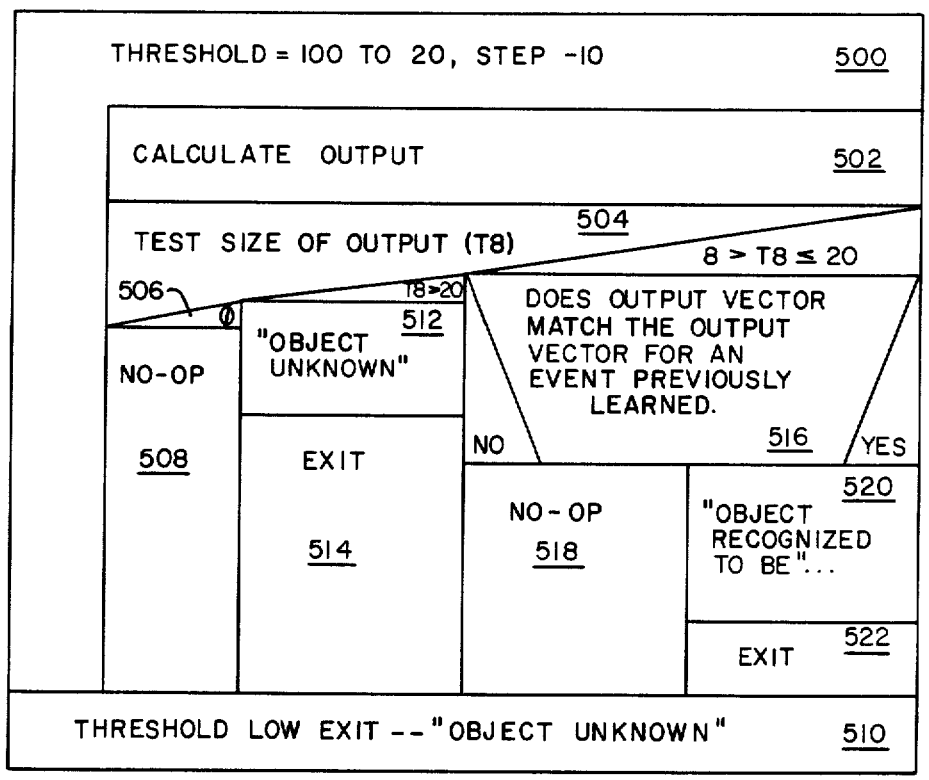
FIG. 17 is a flow chart of the recognition algorithm implemented by the control logic of the system.

Referring to FIG. 17, there is shown a structured flow chart for the recognition algorithm implemented by the control logic of the system. Any control logic that implements the algorithm of FIG. 17, and generates the control signals described above at the appropriate times will suffice for practicing the invention. In some embodiments, the control logic will be a programmed computer. In other embodiments, the control logic will be a sequential state machine. The exact details of the control logic are not critical to the invention. Indeed, the entire invention may be practiced in a general purpose digital computer. The source code of Appendix A represents the program which implements the process of the invention on an IBM PC.

The first step of recognition, block 500, is to set the convergence theta at its initial value and to establish a main loop to step the convergence threshold down to some lower limit in steps of some incremental size. In the embodiment represented by the flow chart of FIG. 17, the maximum threshold theta is set at a value of 100 units, the minimum at 20 and the step size at −10. Other embodiments may use different limits or step sizes.

The next step, represented by block 502, is to perform a read cycle and to calculate the convergence in the manner described herein. This step includes waiting a sufficient amount of time for all feedback convergence responses to occur and for the output vector to settle to some stable pattern. This will establish the output vector for the current threshold level.

Following the calculation of the convergence output pattern, a test represented by block 504 is performed to calculate the number of target lines which have converged. Calculation of the actual number of converged target lines is not necessary in the preferred embodiment. It is only necessary to know whether the number of target lines which have converged is 0, greater than 20 or within an acceptable range defined by the user.

The test of 504 has three branches or cases. Block 506 is the case where the size of the output was 0. In this case, processing proceeds to block 508 which is a no operation block and from there returns to loop block 500 where the convergence threshold is lowered by 10 units. If the threshold lower limit has not been reached, processing proceeds to block 502. This new read cycle is performed in accordance with the timing of FIG. 13. If the lower limit has been reached, processing proceeds to block 510.

If the size of the output was greater than 20 for the current theshold theta, processing proceeds to block 512. Here, the message "object unknown" is sent in any known fashion. The upper limit, here shown as 20, should be set above that number of target lines, allowed during learning, for any valid event. Thereafter, the recognize algorithm is exited as symbolized by block 514 and neither loop block 500 nor block 510 is reentered.

If the size of the output is between the user defined upper and lower limits (8 and 20 in the preferred embodiment), processing proceeds to block 516 where a comparison to the stored patterns of previously learned events is performed. If there is no match, processing proceeds to block 518 where no operation is performed, and, from there, to loop block 500 to lower the threshold as described above. If there is a match, then processing proceeds to block 520 where the message "object recognized to be . . . " is sent to identify the event. Thereafter the recognize routine is exited as symbolized by block 522 and neither loop block 500 nor block 510 is reentered.

The Learning Algorithm

Figure 18:
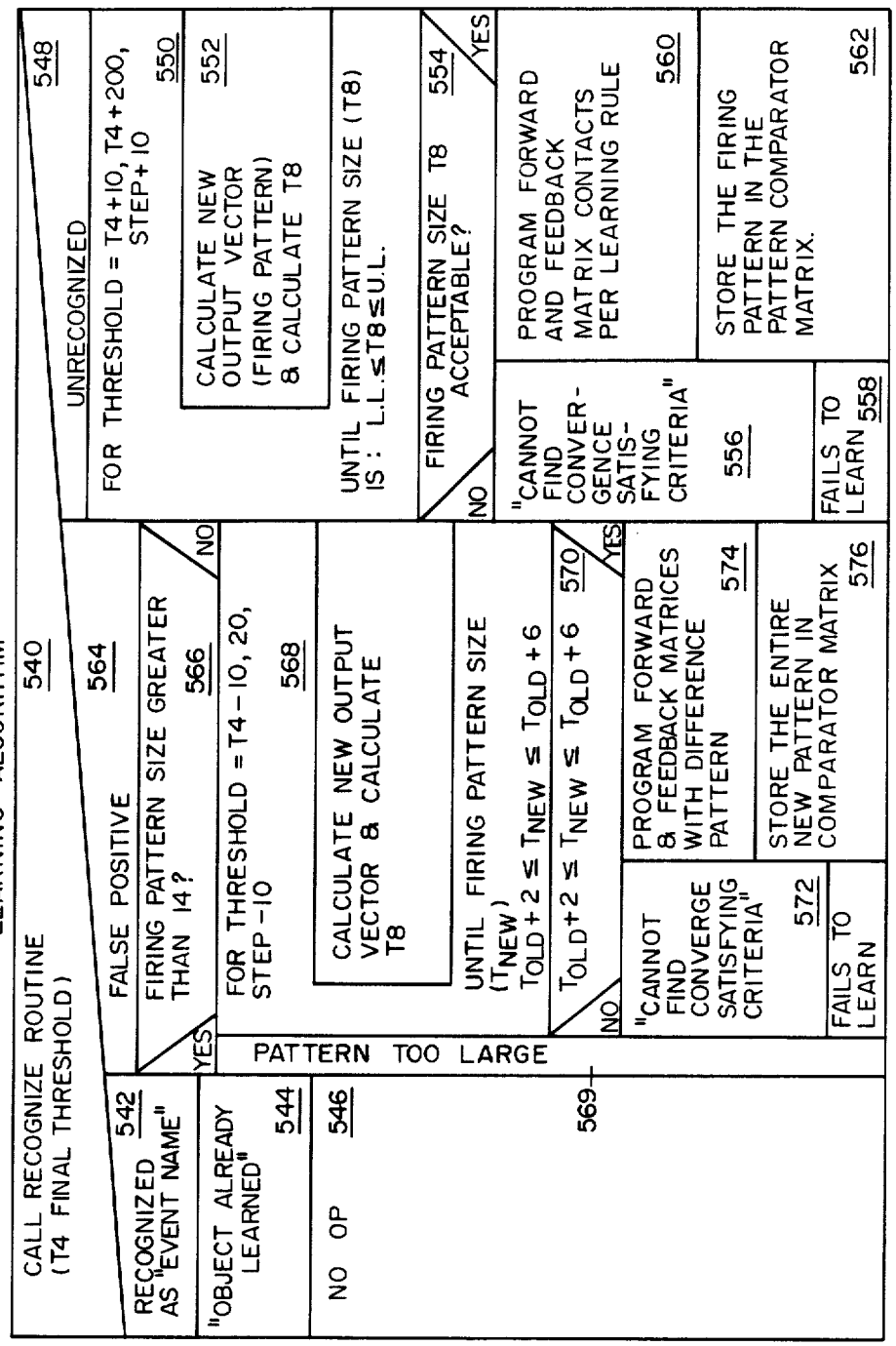
FIG. 18 is a flow chart of the learn algorithm implemented by the control logic of the system.

Referring to FIG. 18 there is shown the algorithm implemented by the control logic in learning events. The first step in learning is to examine the input pattern to determine if the event has already been learned. This step is symbolized by the block 540 which is a call to the recognize routine of FIG. 17 to be performed as a subroutine. The recognition routine will result in either a "recognized" or a "not recognized" message. If the message is "recognized", the machine may be right or it may be wrong. Thus, there are three cases which can result in the learn routine after the recognize routine is run. If the event has been correctly recognized as signaled by the user when comparison of the machine's event identification message and the actual event identification has been completed, processing proceeds to the path consisting of blocks 542, 544 and 546 where the machine indicates that the event to be learned has already been learned and finishes the learn routine by not programming any contacts and indicating that the machine is ready to learn a new event.

If the event was not recognized, then processing proceeds to the path starting with block 548. This path will cause the programming of the appropriate contacts to cause the machine to learn the event. The block 548 will be entered if the control logic exited from the recognize routine at the blocks 514 or 510 in FIG. 17. When it exits from either of these exits there will be a threshold which exists at the time of exit. This threshold is called T4. Processing then enters a "do until" loop symbolized by block 550 which is intended to build the theshold back up until the size of the output T8 (the number of target lines which have converged) is within an acceptable range. This is done by starting with the threhold T4 and incrementing it by 10 and proceeding to block 552 to calculate convergence again and to determine T8. This process of incrementing the current threshold by 10 and recalculating convergence and T8 continues until either the upper limit (T4+200 in this illustrated embodiment) is reached, or until T8 is within the acceptable range delimited by the user defined upper limit (U.L.) and the user defined lower limit (L.L.).

Processing then proceeds to block 554 where the size of T8 is tested. If T8 is still not within the acceptable range and since the threshold has now been increased to the maximum of T4+200, then processing proceeds to block 556 where the machine signals that the convergence criteria cannot be met. The learn routine then is finished, and nothing has been learned at block 558.

If the convergence criteria is reached, and T8 enters the acceptable range, then blocks 560 and 562 are performed to program the matrices and store the pattern in the pattern comparator matrix. The contacts in the foward and feedback matrices are programmed to the normal case learning rule specified above.

If the input event was incorrectly recognized, the user so informs the machine, and the false positive path of block 564 is entered. The first step in the process of distinguishing the input event from the event for which it was mistaken is to determine if the size of the firing pattern is larger than 14 as symbolized by block 566. If it is, no learning is allowed. Firing patterns which are too large are undesirable because they tend to cause confusion in the recognition process. More patterns can be learned without confusion in the recognition process if the output vector size is kept small. the block 568 is entered if the firing patternn size is larger than 14 and the message "pattern too large" is sent to indicate to the user that no learning will occur.

If the firing pattern size is less than or equal to 14, then a do until loop symbolized by block 568 is entered. This block loops on decreasing thresholds starting from $T4-10$ and going down to a lower limit of 20 in steps of $-10$ theta units. On each theta step, the convergence is again calculated and T8 is determined. This process is continued until T8 changes to have between 2 and 6 new converged target lines that had not converged for previously learned event for which the input event was mistaken. If this condition occurs, or if the lower limit is reached, processing proceeds to the test of block 570.

Block 570 tests to determine if the number of target lines which have now converged, $T_{new}$ is in the sought after range, i.e., between t and 6 additional target lines. If this is not the case, then block 572 is entered and the message is sent that the convergence criteria cannot be met and the machine fails to learn.

If $T_{new}$ is in the acceptable range, blocks 574 and 576 are performed to program the forward and feedback matrices with the difference pattern and to store the entire new pattern in the pattern comparator matrix. This completes the learning process.

The Advantages of the System of the Invention Over The Prior Art

Although all the advantages of the invention have not as yet been identified by the inventors, some of the features of the invention over the prior art which are believed to be advantageous are as follows. The forward matrix is sparsely populated with contacts. This means that the number of input lines and target lines is high relative the number of contacts in the forward matrix. In the preferred embodiment, only about 18% of the intersections in the forward matrix are coupled to contacts. This difference over the prior art is profoundly important for at least two reasons. First, it allows the "convergence-selection" learning and recognition rules described herein to be implemented while maintaining a realistic range of convergence threshold value needed to distinguish between similar and overlapping (non-orthogonal) input vectors. The convergence-selection rule is useful because it allows the number of output vectors which can define distinct input events to be greater. If convergence selection were not used and two input events with 50% of the input lines active for each were learned, then the target lines which were programmed to learn those events would no longer be useful to distinguish one event from another for subsequent events since they would be highly likely to fire any time any input event occurred. A convergence rule prevents this from happening thereby minimizing the number of target lines which become non useful for recognition of events other than the events for which they were programmed. In other words, without convergence selection an active input line would activate every target line to which it was coupled by a contact. This would cause excessive numbers of target lines to fire, and would limit the usefulness of those target lines to identify later events because they would come on every time that input line was active. With large input vector size, the fraction of target lines which lose their significance in identifying events relative to the total number of target lines becomes large and confusion results.

To avoid this problem, Kohonen and other workers in the art went to a convergence rule for firing of target lines. However, because of the presence of the forcing inputs in association matrices such as that of Kohonen, as convergence rule causes "binding" in the operation of such a machine. Hereafter, the term "association matrix" will be used to refer to Kohonen type matrices with forcing inputs. The embodiments disclosed herein with no forcing inputs will be referred to as "recognition matrices" or "recognition matrix". The binding is as follows. Since the user selects the target lines that are supposed to converge for a given event, the size of input vectors is restricted to be sufficiently large to cause convergence on the desired lines. Small input vectors may not have enough input vectors active to cause convergence on the desired target lines. Thus, the Kohonen and other association matrices cannot gracefully handle diverse sizes of input vectors.

Because of the convergence-selection rule and the sparseness of the forward matrix, the system of the invention can discriminate between many input vectors some or all of which are similar, i.e., with large amounts of overlap or many of the same input lines active in each pattern, without requiring the system to cycle through many threshold steps to distinguish between the input events. The number of read steps at different thresholds needed to distinguish between similar input vectors is diminished by approximately the same factor that the denseness of the forward matrix is diminished.

The sparseness of the forward matrix contact population allows many different sizes of input vectors (expressed in terms of the numbers of input lines which are active) to be handled gracefully without degradation in the performance of the system in terms of the number of threshold steps which are needed to get an output vector of an acceptable size. The underlying reason for both these advantages lies in the relationship between input vector size, forward matrix contact population density and convergence, i.e., the size of the output vector. The sparseness of the contacts and the randomness of their locations in the forward matrix tends to spread the convergence responses randomly over the entire set of target lines and to hold down the number of target lines which converge. The randomness of the contact placement causes the system to have a Poisson distribution of convergence on its target lines. This Poisson distribution of convergence means that the number of target lines which converge for any given input size is an exponential function of the input vector size. Dense association matrices with approaching 100% contact density like that of Kohonen converge on many if not all target lines for large input vector sizes unless the threshold is kept very high. If the threshold is kept high, the device must cycle through many threshold steps to discriminate between similar, non orthogonal input vectors. Kohonen does not teach a convergence which is altered by the machine automatically until the size of the output vector is within an acceptable range. This means that to keep the size of the output vector small (which is desirable for reasons developed further below) Kohonen msut keep his theshold high. However, this also limits the sizes of input vectors which the Kohonen model can handle with grace. That is, if the threshold is adjusted to get the proper output vector size for an input event which activates 75% of the input lines, when another input event happens which activates only 40% of the input lines, the output vector size might be too small or non existent because of the high, non variable threshold. This hampers the utility of the prior art dense matrices if they do not have variable thresholds.

In one broad sense, the teachings of the invention is that an association matrix such as that of Kohonen with a sparse matrix is new, useful and unobvious. Accordingly, in some equivalent embodiments, the systems of FIGS. 1 and 11 with sparse forward matrices may be modified to add forcing inputs at the top on a one to one basis for each of the target lines 32. The forcing inputs would be contacts such as the one shown in FIG. 2 which could be controlled by the user to force predetermined target lines selected by the user to represent particular events to converge. In these embodiments, the forcing inputs could be used to force a completely or substantially completely orthogonal output vector set to represent the class of input events to be learned. That is a pre-chosen set of output vectors could be chosen by the user which are substantially or completely orthogonal, i.e., no or little overlap. Each output vector would be assigned to a particular event. When event number 1 was to be learned, the forcing inputs would be used to force the output vector convergence selected for that event. Programming of the forward matrix and feedback matrix would then proceed as described herein. This embodiment would result in a very effective feedback matrix and should result in less confusion. Of course the other attributes of the invention such as sparse forward matrix, variable convergence threshold and the ability to handle false positives in the learning mode and the feedback matrix would be maintained in these embodiments.

Another feature of the embodiments of the invention is its ability to handle gray scale input values as opposed to binary inputs which are only on or off. The Kahonen device and many other of the prior art devices cannot deal with gray scale input values. This tends to give the machine a much better definition of the event learned, i.e., the resolution of the features which can be learned about an event is finer. In some alternative embodiments, the learning rules may be changed slightly to not program a contact unless the "pixel" with which it is associated has greater or less than a particular "input learning threshold" value, e.g., contacts associated with a pixel which can have analog values from 0 to 15 will only be programmed if the pixel value was greater than 8.

In yet another broad sense the teaching of the invention is that variable, user definable convergence thesholds are new, useful and unobvious improvements in the prior art association matrices such as Kohonen with dense forward matrices and forcing inputs. Accordingly, in other embodiments of the invention the matrices of FIGS. 1 and 11 could be modified so that the forward matrices are densely populated with contacts, but the variable convergence threshold circuitry is maintained. Such an embodiment will of course require large numbers of threshold steps to be used in successive read cycles to distinguish between similar. large, nonorthogonal inputs vectors, but such input vectors could still be recognized and could still be distinguished.

The sparseness and randomness of the forward matrix could be achieved in other equivalent ways also. In other equivalent embodiments, it is possible to achieve sparseness and randomness in the forward matrix by placing a contact structure at every intersection of an input line and a target line and then randomly selecting for initial programming (prior to the first learning episode) a sparse percentage, e.g., 17%, of them. In other equivalent embodiments, a contact structure may be placed at every foward matrix intersection, and the contacts may be initially programmed prior to the first learning episode at random programming levels. Such programming levels could be, for example, 0 to 2 or 3 volts on the floating gates such that there would still be "room" for addition event caused programming to occur since the floating gates may be programmed up to about 6 volts.

In still other embodiments, the forward matrix contact structure or programming is ordered and sparse. Ordered forward matrices are most useful for recognizing input events about which something is known. Otherwise certain associations will be rendered imposible by virtue of the ordering of the contacts. For example, if the input event is a frame from a video display and it is known that there is never any useful identifying information in a particular quadrant (possibly because text information pertaining to or unrelated to the scene is displayed there), then the contacts may be placed in ordered fashion to take advantage of the known fact that there is never any information useable for recognition on certain input lines corresponding to the quadrant known to be non-useful for recognition. In still other embodiments where the class of input events are well known and the information which identifies the event is known to always occur at, for example the same place or in the same frequency band, etc., the contacts in the forward matrix may be placed so as to maximize their convergence responses to the identifying information. However, for input events where the information which distinguishes one pattern from another can appear anywhere in the input vector, the ordering of the contact placement in the forward matrix usually leads to impossibility in making certain associations which would degrade the machine's ability to learn and to recognize events.

In still other embodiments, the forward matrix structure is dense and either ordered or random in terms of either placement of the contacts or the initial programming levels of the contacts, but no forcing inputs on the target lines and controlled by the user are used. Also a different learning rule will be used to prevent strengthening of all contacts on converged target lines with active inputs, since to follow the learning rule of the preferred embodiment would increase confusion in the regonition cycles. The reason for this is that where a dense matrix is used more convergence occurs and more target lines "fire". If all contacts on converged target lines are programmed, the probability that some of these same contacts are going to be activated again by active input lines in subsequent events increases. Since these contacts have been strengthened, the probability that they will again cause convergence for the new and different event increases. The result is that the output vectors for later events begin to look very similar to the output vectors for the later learned events. This can tend to cause less orthogonality of output vectors for later learned events. This is the principle reason the size of the output vectors is kept small relative to the total number of target lines. In alternative embodiments, the output vector size is kept small and excessive convergence is avoided by contact programming which is deliberately kept "weak". This loss of orthogonality for output vectors for later events can tend to cause confusion and decreases the discriminative powers of the machine. Sparseness in the forward matrix tends to decrease this effect. However, where a dense matrix is used, the convergence threshold may be kept high and can be varied by the user or automatically by the machine so as to keep excessive convergence from occurring.

An alternative method of using the embodiments of the invention for recognition without the risk of excessive confusion would be to use a plurality of the systems connected in parallel to the input data and train each system to recognize only one event. When the combined system is put into the recognition mode, all the systems will look simultaneously at the input data and only the system which recognizes its event will signal recognition and give the identifying pattern whereas all the other systems will signal no recognition. This embodiment totally eliminates confusion, and would be most practical in integrated forms of the invention where each system would be inexpensive.

The embodiments of the invention also all emulate the natural phenomenon of strong and weak memories because of the manner in which the contact programming occurs. That is, if the same event is presented to the machine for learning several times, the programming of the contacts activated by that event will be programmed with more charge on the floating gates of the involved contacts than if the event is presented only once.

Another difference over the prior art is that for use of some embodiments of the invention, it is not necessary for the user to define to the machine a particular output vector which the user wishes to use to represent a particular event. The some embodiments of the machine described herein does not require such an initial user interaction thereby simplifying its use. Instead, the output vector becomes the collection of target lines upon which a given, user defined degree of convergence occurs, said collection being a random set because of the randomness of the contact structure or programming of the forward matrix (the output vector is "convergence selected" as opposed to being operator selected).

In the invention, contact programming is positive only for all contacts coupled to active input lines and converged target lines. This fact coupled with the fact that the machine and the method of operating it require a series of decreasing thresholds for recognition result in an apparatus which is better able to recognize degraded signals representing an input event which has been previously been learned, i.e., input signals obscured by a noisy background or input signal patterns where some of the pattern is missing. Kohonen's association matrix does not automatically vary the convergence threshold upon repetitions of the input event until recognition occurs. This limits the ability of the Kohonen device and all prior art devices without variable convergence thesholds and gives the invention an advantage in all arees where the ability of the convergence threshold to be varied is important. These advantages of the invention include recognition of cluttered signals, recognition of incomplete input patterns and the ability to handle the false positive case. Neither the Kohonen association matrix model nor the Hopfield relaxation models can correct the learning process to account for erroneous false positive identifications. This limits the ability of associative matrices and other prior art devices or models with no false positive mechanisms to handle input vector sets which are not orthogonal. This is a major problem in the utility of these devices and models. Although the Sejnowski and Hinton models do have error correcting capability, this capability has a cost associated with it in terms of lost learning from previously learned events.

Further, it is not clear from the Kohonen and Hopfield writings that either of their models can actually be reduced to practice in an actual working hardware and/or software implementation. The applicants believe that a Kohonen type machine may have been built by TRW, Inc. (Cleveland, Ohio and Redondo Beach, Calif., but the details are not believed to have been published, and it is unclear whether the machine is publicly available at the time of this writing. Hopfield has published designs for electronic implementations, but it is not clear whether any of them have been actually built. The original perceptrons have been built, but the applicants believe that the other literature in this area describes only models and not actual machines which have been built.

To expand upon the ability of the system described herein to recognize cluttered signals, after programming the machine in a noise free environment, the contacts which will have active inputs because of valid signal components in the input vector are "strengthened". The term "strengthened" as it is used herein is used in the sense that the strengthened contacts will cause convergence responses of greater magnitude than the non programmed, or non strengthened contacts. Thus, when a valid input vector which has been previously been learned appears but is cluttered with noise or other interference, the machine will recognize it by "picking it out of the noise" by virtue of the continual read cycles coupled with ever decreasing thresholds. Eventually, the user defined convergence threshold will be lowered enough that the valid pattern emerges in the output vector where the input lines which are active because of spurious noise or interference will generally not be able to cause enough convergence response to reach the level of the convergence threshold. Essentially, because of the learning, the machine will be able to recognize the valid patterns in the noise at a high enough threshold to screen out the noise and thereby avoid its detrimental effect.

Contact strength of the programmed level of convergence response magnitude for any given contact is only increased during learning of events. Contact strength is never decreased except when the entire matrix is erased. The advantage of this learning rule is that the programming from previously learned events is not necessarily diminished or obliterated during subsequent learning of new events. The machine can learn multiple events in this manner without loss of its recognition power for earlier learned events.

The machine and recognition method of the invention allows the machine to recognize previously learned input patterns even when part of the input pattern is missing. The presence of the feedback matrix and the learning rule implemented by the machine in programming the feedback matrix contacts combine to coupled with the algorithms for recognition provide the machine to recognize incomplete input patterns. The reason for this is the operation of the feedback matrix contacts in causing additional feedback convergence response which tends to reinforce or add to the total convergence response on target lines which are supposed to be converging or are actually converging for a previously learned event when that event once again appears at the input. For example, suppose a particular event is learned as a pattern of target lines 2, 4 and 5. The next time the event is present for recognition at the input, assume that only target lines 2 and 5 converge because part of the input pattern is missing. Because of the learning rule for the feedback matrix, the convergence of the target lines 2 and 5 cause a user defined level of convergence response on the target line 4. The recognition algorithm causes the threshold to be continually lowered on successive read cycles until a learned pattern is recognized, the threshold gets too low or the number of target lines exceeds the user defined maximum number. Because of the feedback convergence response on target line 4, it is very likely that the convergence threshold theta will eventually reach a low enough point that the learned output vector 2, 4, 5 will eventually emerge and be recognized. Thus recognition will occur even though the input pattern was incomplete.

A Parallel, Associative Matrices Embodiment

Figure 19:
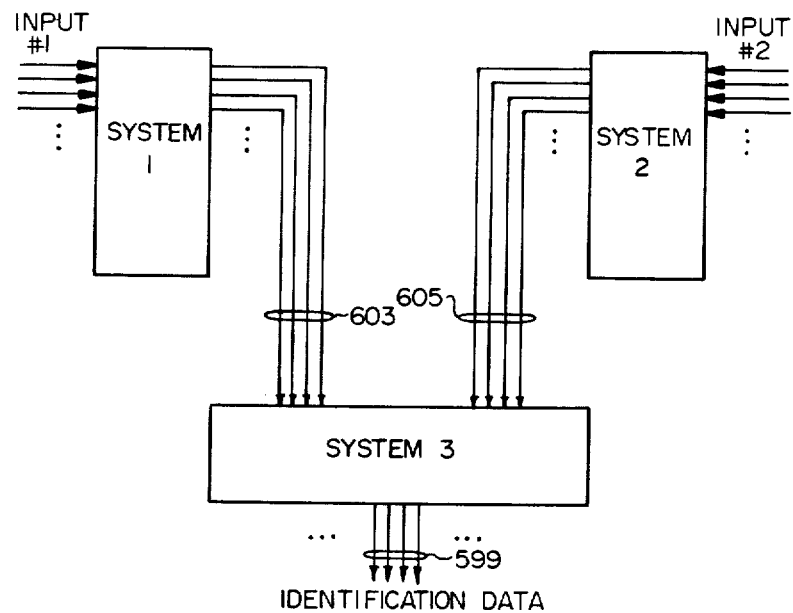
FIG. 19 is a block diagram of a parallel, associated matrix embodiment which can identify an event by examining two different sets of data relating to two different forms of characteristics.

Referring to FIG. 19 there is shown a system for learning and recognition of events which are characterized by at least two different forms of input data. Each of systems 1, 2 and 3 represent any of the embodiments of the invention disclosed herein. System 1 receives input signals from a first set of sensors and their associated signal processing or pre conditioning circuits (not shown). These can be any type of sensors, but for illustration assume the number 1 input lines originate from a video camera. System number 2 receives inputs from different types of sensors. Assume for illustration that the number 2 input lines originated from audio processing circuitry which examines the characteristics of voice sounds and generates a plurality of inputs which indicate the characteristics of the sounds. Assume that system 1 has been trained to recognize all the faces of a particular organization, and that system 2 has been trained to recognize all the voices of the people in the same organization. The outputs from systems 1 and 2 are applied as inputs to a third system which has been trained to know all the valid combinations of face and voice identification data patterns which systems 1 and 2 generate when any legitimate member of the organization stands in front of the camera driving system 1 and speaks into the audio circuitry driving system 2. System 3 will then output a "recognize" signal on the bus 599 with the identification of the person if the person was one of the legitimate members of the organization and will not recognize any imposters. Of course the system of FIG. 19 could also be used in a large number of other ways as well.

Figure 20:
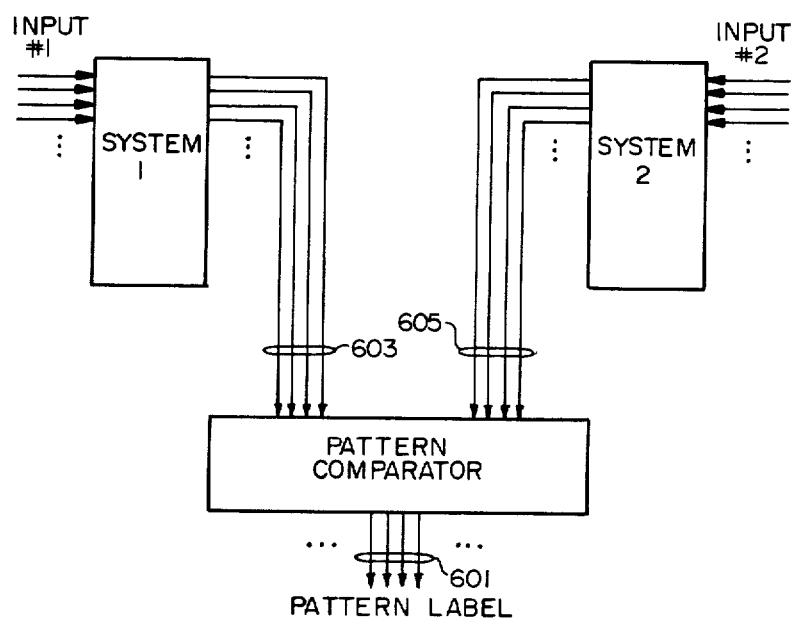
FIG. 20 is an alternate embodiment of the system of FIG. 19.

FIG. 20 shows an alternative, equivalent embodiment for the system of FIG. 19. In FIG. 20 systems 1 and 2 are the same structure and work in the same manner as in FIG. 19. However, instead of supplying their outputs to a third system like systems 1 and 2, their outputs are coupled to the input of a pattern comparator like that shown in FIG. 16 or some equivalent thereof. The pattern comparator then outputs an identification code or pattern label on the bus 601 when the patterns on the buses 603 and 605 match a pattern stored in the pattern comparator. In the example given above, the patterns stored in the pattern comparator are the voice and face identification patterns of all legitimate members of the organization.

The embodiment of FIG. 19 can be slightly modified by eliminating the feedback matrices in systems 1 and 2 without loss of the ability of the system to do recognition. The reason for this is that if the voice or visual data is partially degraded and the patterns on the buses 603 and 605 are not complete or somehow not identical the patterns there is a non degraded situation, the system 3 can still do the recognition. This would not be true of the embodiment of FIG. 20 since the comparator is "dumb", and cannot recognize anything except an exact match.

An Associative Memory System

It is useful to have an electronic memory system which can associate one event with another and which can do this in accordance with the amount of practice that the system has had in making the associations. Such a system would be trained by input of the two events to be associated in close temporal proximity. That is, if the machine was to be trained to associated a picture of a strawberry with strawberry shortcake, then the machine would be shown a picture of a strawberry and then would be shown a picture of strawberry shortcake shortly thereafter. This association could be formed more strongly with repetition of the learning cycle of the events to be associated.

Figure 21:
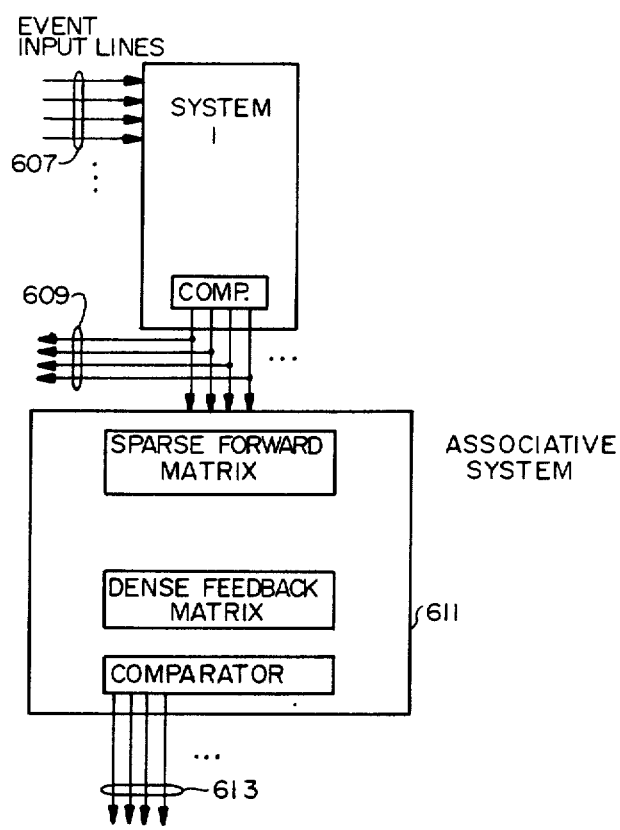
FIG. 21 is a block diagram of an associative memory system which can associate one or more different events with a trigger event each at a strength of association set by the amount of practice given the system by the user in learning the associations.

Referring to FIG. 21 there is shown a system which can perform in the manner described above. The system is comprised of system 1 which can be any of the embodiments disclosed herein. The input lines for the system are the bus 607, and the comparator outputs from system 1 are the bus 609. The outputs are coupled to the input ports of another system similar to system 1 which will be referred to as the associative system. This system is comprised of a sparse forward matrix of the same structure as the embodiments disclosed herein, and a dense feedback matrix. The feedback matrix has a contact propulsion which is very high, and each contact is programmed heavily to enable convergence on the target lines identifying the associated event when the input lines 609 carry a pattern identifying the triggering event.

To use the system of FIG. 21, the user presents the triggering event input signals on the bus 607 and then a short time later, e.g., 200 milliseconds, presents the event to be associated on the bus 607. The system thresholds are adjusted until conditions are proper for learning, and then programming occurs. The associative system programs its contacts in the forward and feedback matrices to converge on a pattern which represents the associated event. This happens because the target lines in the associative systems are converging on the associated event output vector at the time the feedback from the first event is causing convergence responses in the dense feedback matrix of the associative system. This causes convergence on the target lines in the output vector for the associated event which is aided by the presence of the feedback pattern which defines the output vector for the first or trigger event. If the programming is heavy enough or the number of repetitions is high enough, the system will then be able to associate, i.e., recognize, the associated event when the system is shown only the trigger event on the input lines 607. In other words, the trigger event will be shown to system 1 and it will recognize the input vector to represent the trigger event and output a vector on bus 609 which identifies the trigger event. This trigger event output vector will enter the associative system and will cause the feedback pattern into the dense feedback matrix there to be that identifying the triggering event. If the programming level is sufficiently high, and the convergence threshold is sufficiently low, the feedback convergence response caused in the dense feedback matrix will cause convergence on the target lines in the associative system representing the associated event.

Because the programming level of the contacts in the dense feedback matrix gets somewhat higher each time the pair of events to be associated are learned, the strength of the association increases with more "practice", i.e. with more repetition of the learning episodes of the two events in temporal contiguity. This property of the system allows multiple associations to be formed between one trigger event and several associated events, and these associations may be of different strengths. This is a useful property as will be seen from the discussion below. In the preferred embodiment, each target line convergence detecting circuitry in the associative system 611 has an auto-inhibition circuit which is active in the recognition mode and inhibits the target line from "firing" again for a predetermined period after the target line fires. This happens each time a target line fires. This circuit can be used advantageously to operate the system as follows.

Assume the user has trained the system to associate event or object A with events or objects B and C. Assume also that the user has trained the system to associate A with B more strongly than A with C. Now suppose the user wishes to have the system identify, in the order of their strength of association, all the events or objects with which A has been associated in order to search for a particular event or object which the user cannot identify but knows is associated with A. To perform this search, the trigger event A is presented on input line 607. The associative system 611 will have its threshold set at its initial high value and will continue to cycle down through lower thresholds until recognition occurs. The first recognition which will occur will be A with B because that is the strongest association. The associative system 611 will then output identification data for the event or object B on the bus 613. The user will then signal the system whether or not that is event or object being sought. If it is not, the input signals for the trigger event will be reapplied to the bus 607, and the threshold for the associative system 611 will be lowered to the next step below the level it had when association of the B event occurred. This process will be repeated until the threshold for the system 611 reaches a sufficiently low level that the event or object B is recognized. This process can be continued for as many objects or events which have been learned by the system 611 as being associated with trigger event A.

A ROM Recognize Only Embodiment

Figure 22:
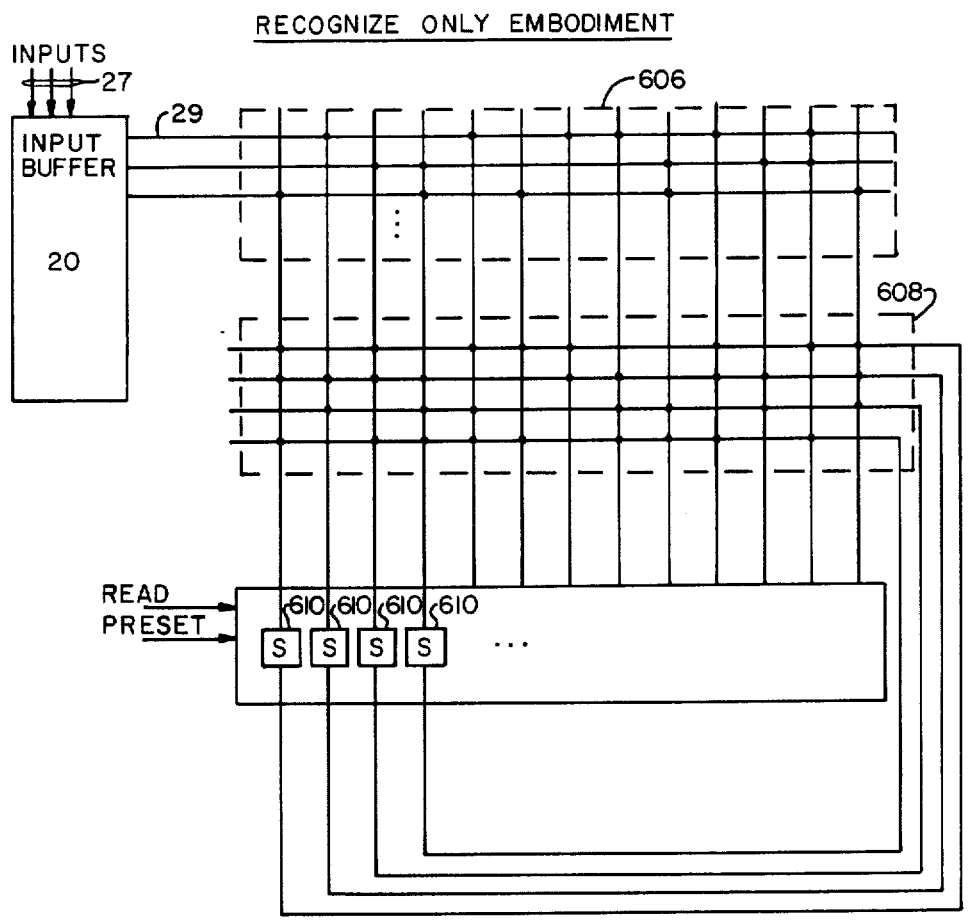
FIG. 22 a block diagram symbolic of the ROM recognize only embodiment of the invention.
Figure 23:
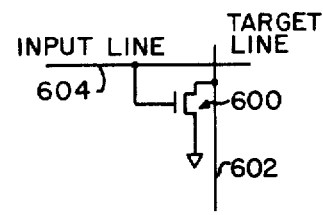
FIG. 23 is schematic diagram of one embodiment of a typical contact structure which could be used in the embodiment of FIG. 23.

Referring to FIGS. 22 and 23 there is shown another embodiment of the invention where all programming is done at the factory such that the device can recognize a predetermined set of events. This embodiment is different from the embodiment shown in FIG. 1 in that there is no programming circuitry in the system, and the contact structures are much simpler. However, the comparator circuitry, not shown, is identical to that described above in FIG. 16. One possible embodiment for the contact structures is as shown in FIG. 23. Programming of each contact to alter the magnitude of its convergence response is done by altering the resistivity of the channel of the MOS transistor 600 at each contact in any known manner. This may be done by changing the doping level in the channels of the contacts such that the transistor meters the proper amount of charge out of the target line 602 when an input signal on the input line 604 receives an input pulse. In the preferred embodiment of this variation, the resistivity of the channels of the devices being programmed at the factory are altered by changing the transistor channel dimensions in to alter its resistivity for a fixed doping level in the substrate. This will give more precise control and reproducibility for the channel resistivity from one batch to another of wafers.

The system is comprised of a forward matrix 606, a feedback matrix 608, and input buffer 20 and a collection of convergence detecting circuits 610, one for each target line. The forward matrix 606 is like the forward matrix 30 of FIG. 1 except that there are no programming lines like line 42 in FIG. 2, and the contacts are like that shown in FIG. 20. These contacts are preprogrammed at the factory for all the events which the chip will be able to recognize in the field. The feedback matrix 608 is just like the feedback matrix 36 in FIG. 1 except that there are no programming lines and each contact is as shown in FIG. 23. There is a contact at those intersections in the feedback matrix that require one, and they are also preprogrammed at the factory for all the events which the chip is to recognize in the field. The convergence detecting circuits are as shown in FIG. 3, and no flip flop 116 such as is found in FIG. 4 is necessary nor is the extensive gating necessary for programming present. The input buffer is identical to buffer 20 in FIG. 1. Other input buffers could also be used.

In the embodiment of FIG. 22, no programming is done in the field. Rather, the "best" pattern of contact strengths is chosen for the entire predetermined set of events that the system is to recognize. Very sophisticated computer algorithms plus hand optimizing may be applied to reach a "best" pattern for programming the contacts although no mathematical formula is known to the inventors at this time for achieving a "best" pattern. Further, the forward matrix contacts may be placed in some ordered way, rather than randomly so as to optimize recognition of the predetermined set of events. An ordered forward matrix is not desirable in some of the embodiments discussed herein where the events to be learned are not predetermined and their distinguishing characteristics are not known. Ordering the contacts in such a case may prevent proper recognition caused by the bias of the ordering itself or may prevent learning of certain classes of input events. Once chosen, this "best" pattern of contact strengths for the forward and feedback matrices is programmed into these matrices at the times the matrices are manufactured. This is done by designing the mask set used to manufacture the integrated circuit such that the chennel dimensions of the various transistors 600 in the matrices are such that the channels have the desired programmed resistivity. The comparator circuitry (not shown) is the same as for the other embodiments disclosed herein.

The advantage of this embodiment is that more contacts can be made in the same size matrix and more input and target lines may be formed. This is because there are no programming lines in matrices to take up die area and there is no space taken up by the programming circuitry. Additionally the contact 20 itself is considerably smaller and simpler that the floating gate contacts 102 and 104 used in the programmable version. This leads to a smaller die for the same size matrix, and, thus, better yields, or to a larger matrix for a given die size. Further, less confusion occurs in the recognition process because the pattern of contact strengths was optimized to minimize confusion between events, which provides some advantage over the learning process algorithm disclosed in FIG. 18. Further, the contacts in the forward matrix may be ordered to further enhance the recognition process.

In contrast, the contact programming at blocks 574 and 560 of FIG. 18 described herein for the field learning embodiments does not result in a contact strength pattern which is optimized to avoid confusion. The programming process of FIG. 18 programs contacts for each event considered alone and without regard for the programming which occurred during previous learning episodes or will occur in future events. The optimized ROM recognize only embodiment can taken into account the entire set of patterns to be learned and optimize the contact programming to take into account the entire pattern for all the events when considered as a whole.

A No-Confusion Recognition System

Figure 24:
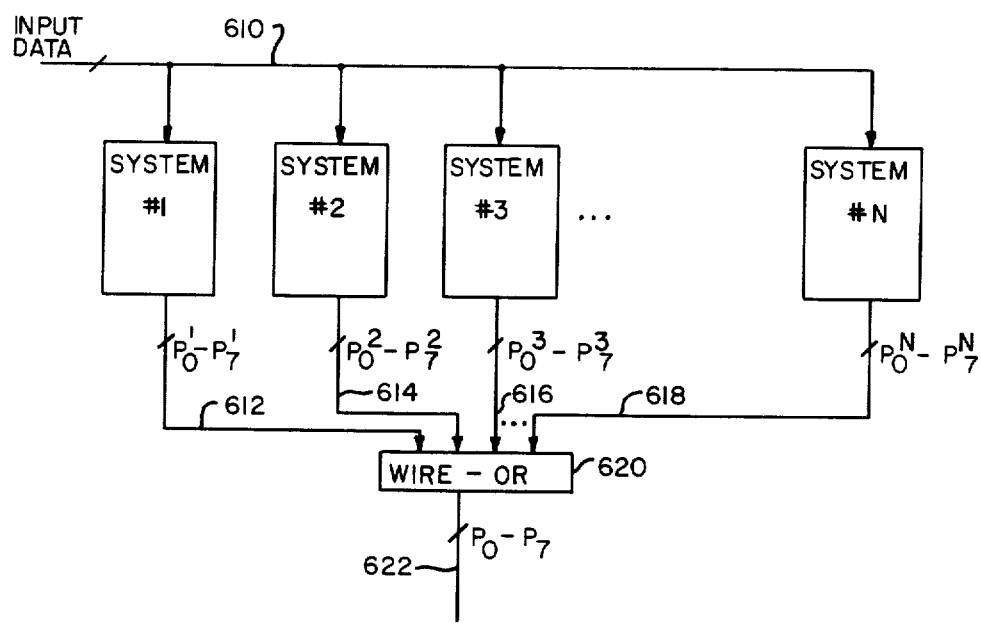
FIG. 24 is a block diagram of a no-confusion system utilizing an array of recognition machines as described herein and each trained to recognize only one event.

An alternative method of using the embodiments of the invention for recognition without the risk of excessive confusion would be to use a plurality of the systems connected in parallel to the input data and train each system to recognize only one event. Such an embodiment is shown in FIG. 24. In this embodiment, the event data for the event to be recognized is input on the bus 610. Each of the systems labelled #1, #2, #3 ... #n are any one of the embodiments mentioned herein, but each is programmed to recognize only one event. When the combined system is put into the recognition mode, all the systems will look simultaneously at the input data and only the system which recognizes its event will signal recognition and give the identifying pattern whereas all the other systems will signal no recognition. The output signals from each system emerge from the comparators on the output buses 612, 614, 616 and 618. The output pattern labels on these buses will be all zeroes except for the system which recognized its event. All the pattern labels are wire-OR'ed in logic 620 such that the pattern label which emerges on the output bus 622 is the pattern of the event which was recognized. Other embodiments may use a multiplexer which has one input coupled to each of the buses 612 through 618. The recognition positive or PATTERN VALID signals from each system (not shown) may then be coupled to the select inputs of the multiplexer so that the active PATTERN VALID signal will cause the signal on the output bus of the corresponding system to be selected for coupling to the output bus 622. These embodiments totally eliminate confusion, and would be most practical in integrated forms of the invention where each system would be less expensive to build.

Although the invention has been described in terms of the preferred embodiment disclosed herein other modifications and embodiments will be apparent to those skilled in the art. All such modifications and embodiments are intended to be included within the scope of the claims appended hereto.

What is claimed is:

1. A recognition matrix having a plurality of input lines and a forward matrix defined by said input lines and a plurality of target lines which terminate in convergence detecting circuits and a feedback matrix defined by said target lines and a plurality of feedback lines from the outputs of said convergence detecting circuits, each matrix having a plurality of contact structures coupled to selected target lines in said forward matrix, said recognition matrix characterized by the contact structures each being permanently programmed to have a characteristic to cause a predetermined convergence response on its associated target line in response to an active input signal received by said contact structure said predetermined characteristics being programmed by the user after optimization of the convergence response patterns of all said contacts for a given class of events to be learned.

2. A system for recognizing any of a plurality of input events comprising:
an input bus for carrying a plurality of input signals characterizing an event;
an array of recognition machines each having data inputs coupled to said input bus and each trained to recognize one event, each said recognition machine comprising:
an association matrix having a forward matrix and using a convergence rule to create an output vector and further comprising means for altering the convergence threshold used in implementing said convergence rule;
means in said means for altering the convergence threshold for automatically altering said convergence threshold on successive repetitions of said input event until recognition occurs or some other predetermined condition is met; and
characterized by the fact that the forward matrix of said association matrix is sparsely populated with randomly spaced contacts.

* * * * *